US012791330B2

(12) United States Patent
Sharma et al.

(10) Patent No.: US 12,791,330 B2
(45) Date of Patent: *Nov. 10, 2026

(54) TRANSPORTATION ROUTE ERROR DETECTION AND ADJUSTMENT

(71) Applicant: Lyft, Inc., San Francisco, CA (US)

(72) Inventors: Shashi Kant Sharma, Redwood City, CA (US); Xianzhe Liang, Belmont, CA (US); Ricky Chachra, New York, NY (US); Xabier Azagirre Lekuona, New York, NY (US); Gerardo dela Rosa Michicol, Dublin, CA (US); Piyush Garg, San Francisco, CA (US); Adriel Frederick, Berkeley, CA (US); Chirag Chhagan Chheda, San Francisco, CA (US); Jack Chun Zhou, San Francisco, CA (US); Amarnath Pundalika Pai, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/096,246

(22) Filed: Mar. 31, 2025

(65) Prior Publication Data

US 2025/0258004 A1 Aug. 14, 2025

Related U.S. Application Data

(63) Continuation of application No. 18/470,893, filed on Sep. 20, 2023, now Pat. No. 12,270,665, which is a (Continued)

(51) Int. Cl.

| | |
|---|---|
| ***G01C 21/34*** | (2006.01) |
| ***G06Q 10/02*** | (2012.01) |

(Continued)

(52) U.S. Cl.

CPC ..... *G01C 21/3438* (2013.01); *G01C 21/3453* (2013.01); *G06Q 10/02* (2013.01); (Continued)

(58) Field of Classification Search

CPC ............ G01C 21/3438; G01C 21/3453; G06Q 10/02; G06Q 10/047; G06Q 10/063; G06Q 30/0284; G06Q 50/30

(Continued)

(56) References Cited

U.S. PATENT DOCUMENTS 10,127,496 B1 * 11/2018 Fu .......................... G06N 3/044
10,906,422 B2 2/2021 Ando
(Continued)

OTHER PUBLICATIONS

"Vehicle route prediction and time of arrival estimation techniques for improved transportation system management" Published by IEEE (Year: 2003).*

(Continued)

*Primary Examiner* — Zeina Elchanti
(74) *Attorney, Agent, or Firm* — Keller Preece PLLC

(57) ABSTRACT

Methods and systems for correcting errors in transportation routes are provided. In one embodiment, a method is provided that includes receiving a transportation request that includes at least two locations. A first route prediction may be generated based on a first set of previously-completed routes associated with the at least two locations. A first predictive model may compare the first route prediction with route information associated with a second set of previously-completed routes identified based on the first route prediction. A second route prediction may be generated based on the comparison and may be sent to a mobile device for presentation to a user.

20 Claims, 10 Drawing Sheets

Related U.S. Application Data continuation of application No. 16/569,648, filed on Sep. 12, 2019, now Pat. No. 11,781,874.

(51) Int. Cl.

| | |
|---|---|
| ***G06Q 10/047*** | (2023.01) |
| ***G06Q 10/063*** | (2023.01) |
| ***G06Q 30/0283*** | (2023.01) |
| ***G06Q 50/40*** | (2024.01) |

(52) U.S. Cl.

CPC ......... *G06Q 10/047* (2013.01); *G06Q 10/063* (2013.01); *G06Q 30/0284* (2013.01); *G06Q 50/40* (2024.01)

(58) Field of Classification Search

USPC .......................................................... 701/533

See application file for complete search history.

(56) References Cited

U.S. PATENT DOCUMENTS

| | | | | |
|---|---|---|---|---|
| 2017/0193405 | A1 | 7/2017 | Lambert et al. | |
| 2017/0286884 | A1 | 10/2017 | Shoval et al. | |
| 2019/0339709 | A1 | 11/2019 | Tay et al. | |
| 2020/0033148 | A1 | 1/2020 | Singh et al. | |
| 2020/0104963 | A1 | 4/2020 | Aich | |
| 2020/0166929 | A1* | 5/2020 | Jiwani | B60W 40/09 |
| 2020/0279345 | A1 | 9/2020 | Jiwani et al. | |
| 2020/0363211 | A1 | 11/2020 | Furuichi et al. | |
| 2021/0303877 | A1 | 9/2021 | Jain et al. | |
| 2021/0304098 | A1 | 9/2021 | Yang et al. | |

OTHER PUBLICATIONS

Karbassi et al.; "Vehicle route prediction and time of arrival estimation techniques for improved transportation system management" Published by IEEE (Year: 2003).

U.S. Appl. No. 16/569,648, Jan. 26, 2023, Office Action.

U.S. Appl. No. 16/569,648, Jun. 2, 2023, Notice of Allowance.

U.S. Appl. No. 18/470,893, Apr. 26, 2024, Office Action.

U.S. Appl. No. 18/470,893, Aug. 7, 2024, Office Action.

U.S. Appl. No. 18/470,893, Dec. 6, 2024, Notice of Allowance.

* cited by examiner

TRANSPORTATION ROUTE ERROR DETECTION AND ADJUSTMENT

CROSS-REFERENCE TO RELATED APPLICATIONS

This application is a continuation of U.S. application Ser. No. 18/470,893, filed on Sep. 20, 2023, which is a continuation of U.S. application Ser. No. 16/569,648, filed on Sep. 12, 2019. The aforementioned application is contained herein by reference in its entirety.

BACKGROUND

Individuals desiring transportation (e.g., transportation by vehicle) between two locations can submit transportation requests to transportation providers. When fulfilling these transportation requests, transportation providers may predict routes associated with fulfilling the transportation request. For example, the transportation provider may predict a route followed by a vehicle when fulfilling the transportation request.

SUMMARY

The present disclosure presents new and innovative systems and methods to detect and correct errors in predicted transportation routes. In one aspect, a method is provided comprising receiving, by a transportation matching system, a transportation request from a mobile device, wherein the transportation request includes at least two locations and generating, in response to the transportation request, a first route prediction, wherein the first route prediction is based on a first set of previously-completed routes associated with the at least two locations. The method may further include comparing the first route prediction with route information associated with a second set of previously-completed routes identified at least in part based on the first route prediction and identifying, based on the comparison, at least one route prediction error in the first route prediction. The method may also include generating, based on the at least one route prediction error, a second route prediction for the transportation request and sending, from the transportation matching system to the mobile device, the second route prediction.

In a second aspect according to the first aspect, the second set of previously-completed routes is identified based on at least one similarity with the first route prediction selected from the group consisting of a similar predicted starting location, a similar predicted ending location, a similar predicted travel distance, a similar predicted travel time, and a similar predicted route.

In a third aspect according to the first or second aspects, the at least one route prediction error includes at least one error selected from the group consisting of a pickup time error for a vehicle assigned to service the transportation request, a pickup distance error for a vehicle assigned to service the transportation request, a travel time error for an amount of time spent in transit between the at least two locations, and a distance error for a total amount of distance traveled between the at least two locations.

In a fourth aspect according to any of the first through third aspects, identifying the second set of previously-completed routes, comparing the first route prediction to actual route information corresponding to the second set of previously-completed routes, and generating the second route prediction are performed at least in part by a first predictive model.

In a fifth aspect according to the fourth aspect, the first predictive model receives a time for transportation between the at least two locations and marketplace conditions associated with transportation between the at least two locations to generate the second route prediction.

In a sixth aspect according any of to the first through fifth aspects, a second predictive model generates the first route prediction.

In a seventh aspect according to any of the first through sixth aspects, the second route prediction includes one or more of a pickup time for a vehicle assigned to service the transportation request, a drop-off time associated with the transportation request, and a travel time associated with the transportation request.

In an eighth aspect a system is provided including a processor and a memory. The memory may store instructions which, when executed by the processor, cause the processor to receive, by a transportation matching system, a transportation request from a mobile device, wherein the transportation request includes at least two locations and generate, in response to the transportation request, a first route prediction, wherein the first route prediction is based on a first set of previously-completed routes associated with the at least two locations. The memory may store further instructions which, when executed by the processor, cause the processor to compare the first route prediction with route information associated with a second set of previously-completed routes identified at least in part based on the first route prediction and identify, based on the comparison, at least one route prediction error in the first route prediction. The memory may store still further instructions which, when executed by the processor, cause the processor to generate, based on the at least one route prediction error, a second route prediction for the transportation request and send, from the transportation matching system to the mobile device, the second route prediction.

In a ninth aspect according to the eighth aspect the second set of previously-completed routes is identified based on at least one similarity with the first route prediction selected from the group consisting of a similar predicted starting location, a similar predicted ending location, a similar predicted travel distance, a similar predicted travel time, and a similar predicted route.

In a tenth aspect according to the eighth or ninth aspects, the at least one route prediction error includes at least one error selected from the group consisting of a pickup time error for a vehicle assigned to service the transportation request, a pickup distance error for a vehicle assigned to service the transportation request, a travel time error for an amount of time spent in transit between the at least two locations, and a distance error for a total amount of distance traveled between the at least two locations.

In an eleventh aspect according to any of the eighth through tenth aspects, identifying the second set of previously-completed routes, comparing the first route prediction to actual route information corresponding to the second set of previously-completed routes, and generating the second route prediction are performed at least in part by a first predictive model.

In a twelfth aspect according to the eleventh aspect, the first predictive model receives a time for transportation between the at least two locations and marketplace conditions associated with transportation between the at least two locations to generate the second route prediction.

In a thirteenth aspect according to any of the eighth through twelfth aspects, a second predictive model generates the first route prediction.

In a fourteenth aspect according to any of the eighth through thirteenth aspects, the second route prediction includes one or more of a pickup time for a vehicle assigned to service the transportation request, a drop-off time associated with the transportation request, and a travel time associated with the transportation request.

In a fifteenth aspect, a method is provided comprising receiving, by a transportation matching system, a transportation request from a mobile device, wherein the transportation request includes at least two locations and generating, in response to the transportation request, a first route prediction, wherein the first route prediction is based on a first set of previously-completed routes associated with the at least two locations. The method may further comprise comparing, with a first predictive model, the first route prediction with route information associated with a second set of previously-completed routes identified at least in part based on the first route prediction and generating, based on the comparison with the first predictive model, a second route prediction for the transportation request. The method may still further include receiving, after fulfillment of the transportation request, actual route information corresponding to the fulfillment of the transportation request, determining one or more errors between the second route prediction and the actual route information, and updating the first predictive model based on the one or more errors.

In a sixteenth aspect according to the fifteenth aspect, updating the first predictive model includes updating one or more weights used to identify the second set of previously-completed routes.

In a seventeenth aspect according to the fifteenth or sixteenth aspects, a second predictive model generates the first route prediction.

In an eighteenth aspect according to the seventeenth aspect, the method further comprises identifying, based on the comparison with the first predictive model, at least one route prediction error in the first route prediction and updating the second predictive model based on the at least one route prediction error.

In a nineteenth aspect according to the eighteenth aspect, the at least one route prediction error includes at least one error selected from the group consisting of a pickup time error for a vehicle assigned to service the transportation request, a pickup distance error for a vehicle assigned to service the transportation request, a travel time error for an amount of time spent in transit between the at least two locations, and a distance error for a total amount of distance traveled between the at least two locations.

In a twentieth aspect according to the eighteenth or nineteenth aspects, updating the second predictive model includes updating one or more weights used to identify the first set of previously-completed routes.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Figure 1A:
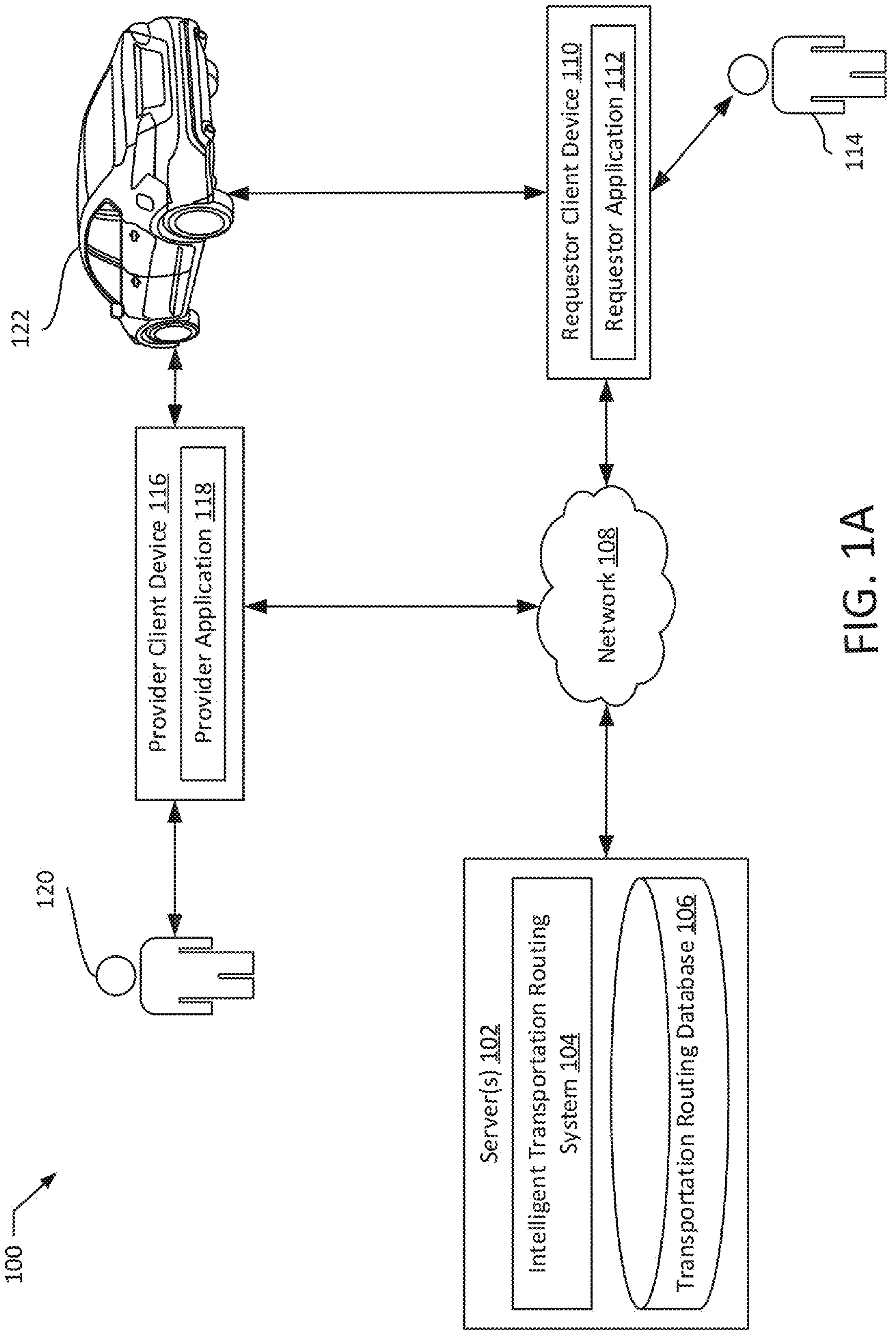
FIG. 1A illustrates an environment for implementing an intelligent transportation routing system.

Aspects of the present disclosure involve systems and methods for correcting errors (e.g., time and distance) in transportation route predictions that predict a time and distance required to travel a specific transportation route between two or more locations.

Various algorithms and processes currently exist for predicting a transportation route for a driver who intends to follow a specific path or route of travel between two locations, or multiple locations. For example, many transportation providers use route prediction algorithms and processes to provide route guidance to users. Transportation providers may include transportation networking companies (TNCs). TNCs may implement a transportation system that matches transportation requests with a dynamic transportation network of vehicles. The transportation system may communicate with computing devices associated with the vehicles in the network. In certain instances, the vehicles may include road-going vehicles and personal mobility vehicles. In some examples, some of the vehicles may be standard commercially available vehicles and some of the vehicles may be owned and/or operated by individuals. In some implementations, the vehicles may additionally or alternatively be autonomous (or partly autonomous). Accordingly, throughout the instant disclosure, references to a "vehicle operator" (or an "operator") may, where appropriate, refer to a human driving a vehicle, an autonomous vehicle control system, an autonomous vehicle, an owner of an autonomous vehicle, an operator of an autonomous vehicle, an attendant of an autonomous vehicle, a requesting user piloting a vehicle, and/or an autonomous system for piloting a vehicle. In one example, the TNC may implement multiple transportation systems, where each transportation system is responsible for coordinating transportation matching for a region or set number of vehicles. In certain implementations, at least one of the transportation systems may allow users to select an individual vehicle for use. For example, a transportation system allocating personal mobility vehicles such as bikes or scooters may allow users to individually select the personal mobility vehicle they will use.

The transportation system may communicate with computing devices associated with the vehicles, which may be separate computing devices and/or may be integrated into the respective vehicles. In some examples, one or more of the computing devices may be mobile devices, such as a smart phone. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or a transportation provider for a transportation matching application, a navigation application, and/or any other application suited for use by requestors and/or operators). Additionally or alternatively, one or more of the computing devices may be devices suitable for installing in a vehicle and/or may be a vehicle's computer that has a transportation management system application installed on the computer to provide transportation services to transportation requestors and/or communicate with the transportation system.

Additionally, the transportation matching system may communicate with user devices requesting transportation. In some examples, the user devices requesting transportation may include a requestor app implemented by the transportation provider. The requestor app may represent any application, program, and/or module that may provide one or more services related to requesting transportation services. For example, the requestor app may include a transportation matching application for requestors. In some examples, the requestor app may match the user of the requestor app (e.g., a transportation requestor) with transportation operators through communication with the transportation system. In addition, the requestor app may provide the transportation system with information about a requestor (including, e.g., the current location of the requestor) to enable the transportation system to provide dynamic transportation matching services for the requestor and one or more providers. In some examples, the requestor app may coordinate communications and/or a payment between a requestor and a provider. According to some embodiments, requestor app may provide a map service, a navigation service, a traffic notification service, and/or a geolocation service.

The transportation system may arrange transportation on an on-demand and/or ad-hoc basis by, e.g., matching one or more transportation requestors with one or more transportation providers. For example, a transportation matching system may provide one or more transportation matching services for a networked transportation service, a ridesourcing service, a taxicab service, a car-booking service, an autonomous vehicle service, a personal mobility vehicle service, or some combination and/or derivative thereof. The transportation system may include and/or interface with any of a variety of subsystems that may implement, support, and/or improve the transportation matching service. For example, the transportation matching system may include a matching system (e.g., that matches requestors to ride opportunities and/or that arranges for requestors and/or providers to meet), a mapping system, a routing system (e.g., to help a provider reach a requestor, to help a requestor reach a provider, and/or to help a provider reach a destination), a rating system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a server computer system, or any other hardware platform capable of providing transportation matching services to one or more requestors and/or providers.

Turning now to the figures, FIG. 1A illustrates a schematic diagram of an environment 100 for implementing an intelligent transportation routing system 104 in accordance with one or more embodiments. This disclosure provides an overview of the intelligent transportation routing system 104 with reference to FIG. 1A. After providing an overview, the disclosure describes components and processes of the intelligent transportation routing system 104 in further detail with reference to subsequent figures.

As shown in FIG. 1A, the environment 100 includes server(s) 102, a requestor client device 110, a provider client device 116, and a network 108. The requestor client device 110 is associated with a requestor 114, and the provider client device 116 is associated with a provider 120. Both the requestor client device 110 and the provider client device 116 are associated with a transportation vehicle 122. As FIG. 1A suggests, the provider 120 provides transportation to the requestor 114 using the transportation vehicle 122.

As further shown in FIG. 1A, the server(s) 102 include an intelligent transportation routing system 104 and a transportation routing database 106. The intelligent transportation routing system 104 utilizes the network 108 to communicate through the server(s) 102 with the requestor client device 110 and the provider client device 116. For example, the intelligent transportation routing system 104, via the server(s) 102, communicates with the requestor client device 110 and the provider client device 116 via the network 108 to determine locations of the requestor client device 110 and the provider client device 116. Per device settings, for instance, the intelligent transportation routing system 104 can utilize the server(s) 102 to receive GPS locations from the requestor client device 110 or the provider client device 116 to estimate a route traveled by the requestor client device 110 or the provider client device 116, respectively.

As used in this disclosure, the term "GPS location" refers to data indicating a computing device's location using a Global Positioning System (or similar system, such as Global System for Mobile Communications). For example, a GPS location includes altitudinal, longitudinal, and/or latitudinal coordinates or degrees that the requestor client device 110 or the provider client device 116 sends to the server(s) 102 and the intelligent transportation routing system 104. In some instances, the intelligent transportation routing system 104 receives data from such a client device encoded to represent a GPS location in various standard GPS formats, such as degrees, minutes, and seconds ("DMS"); degrees and decimal minutes ("DMM"), or decimal degrees ("DD").

As suggested above, GPS locations may indicate a route traveled by the requestor client device 110 or the provider client device 116. The term "route" refers to a course traveled from one location to another location. In particular, a route includes a course traveled by a client device from a starting location to a destination location. For example, a route may include a course traveled by the requestor client device 110 in the transportation vehicle 122 while the transportation vehicle 122 transports the requestor 114 from a pickup location to a destination location. As another example, a route may include a course traveled by the provider client device 116 in the transportation vehicle 122 after the provider 120 drops off the requestor 114 and travels to a different location.

As suggested above, the term "requestor" refers to a person who requests a ride or other form of transportation from the intelligent transportation routing system 104. A requestor may refer to a person who requests a ride or other form of transportation but who is still waiting for pickup. A requestor may also refer to a person whom a transportation vehicle has picked up and who is currently riding within the transportation vehicle to a destination (e.g., a destination indicated by a requestor).

Relatedly, the term "requestor client device" refers to a computing device associated with (or used by) a requestor. A requestor client device includes a mobile device, such as a laptop, smartphone, or tablet associated with a requestor. But the requestor client device 110 may also be any type of computing device as further explained below with reference to FIG. 8. The requestor client device 110 includes a requestor application 112. In some embodiments, the requestor application 112 comprise a web browser, applet, or other software application (e.g., native application) available to the requestor client device 110.

A requestor may interact with a requestor application to request transportation services, receive a price estimate for the transportation service, and access other transportation-related services. For example, the requestor 114 may interact with the requestor client device 110 through graphical user interfaces of the requestor application 112 to input a pickup location or a destination location for transportation. The intelligent transportation routing system 104, via the server(s) 102, may in turn provide the requestor client device 110 with a price estimate for the transportation and an estimated time of arrival of the provider 120 (or the transportation vehicle 122) through the requestor application 112. Having received the price estimate and estimated time of arrival, the requestor 114 may then select (and the requestor client device 110 detect) a transportation-request option to request transportation services from the intelligent transportation routing system 104.

Relatedly, the term "provider" refers to a driver or other person who operates a transportation vehicle and/or who interacts with a provider client device. For instance, a provider includes a person who drives a transportation vehicle along various routes to pick up and drop off requestors. As shown in FIG. 1A, in certain embodiments, the transportation vehicle 122 includes or is associated with a provider. However, in other embodiments, the transportation vehicle 122 does not include a provider, but is instead an autonomous transportation vehicle—that is, a self-driving vehicle that includes computer components and accompanying sensors for driving without manual-provider input from a human operator.

As noted above, both the provider 120 and the transportation vehicle 122 are associated with the provider client device 116. The term "provider client device" refers to a computing device associated with a provider or a transportation vehicle. The provider client device 116 may be separate or integral to the transportation vehicle 122. For example, the provider client device 116 may refer to a separate mobile device, such as a laptop, smartphone, or tablet associated with the transportation vehicle 122. But the provider client device 116 may be any type of computing device as further explained below with reference to FIG. 8. Additionally, or alternatively, the provider client device 116 may be a subcomponent of a transportation vehicle. Regardless of its form, the provider client device 116 may include various sensors, such as a GPS locator, an inertial measurement unit, an accelerometer, a gyroscope, a magnetometer, and/or other sensors that the intelligent transportation routing system 104 can access to obtain information, such as GPS locations and other location information.

Relatedly, the term "transportation vehicle" refers to a vehicle that transports one or more persons for an intelligent transportation routing system, such as an airplane, boat, automobile, motorcycle, or other vehicle. This disclosure primarily describes transportation vehicles as automobiles, such as cars, mopeds, shuttles, or sport utility vehicles, but the intelligent transportation routing system 104 may use any other transportation vehicle.

Although this disclosure often describes a transportation vehicle as performing certain functions, the transportation vehicle includes an associated provider client device that often performs a corresponding function. For example, when the intelligent transportation routing system 104 sends a transportation-request notification to the transportation vehicle 122—or queries location information from the transportation vehicle 122—the intelligent transportation routing system 104 sends the transportation-request notification or location query to the provider client device 116.

As further shown in FIG. 1A, the provider client device 116 includes a provider application 118. In some embodiments, the provider application 118 comprises a web browser, applet, or other software application (e.g., native application) available to the provider client device 116. In some instances, the intelligent transportation routing system 104 provides data packets including instructions that, when executed by the provider client device 116, create or otherwise integrate the provider application 118 within an application or webpage.

In some embodiments, the intelligent transportation routing system 104 communicates with the provider client device 116 through the provider application 118. In addition to those communications, the provider application 118 optionally includes computer-executable instructions that, when executed by the provider client device 116, cause the provider client device 116 to perform certain functions. For instance, the provider application 118 can cause the provider client device 116 to communicate with the intelligent transportation routing system 104 to send data representing GPS locations or receive a transportation-request notification or navigate to a pickup location to pick up a requestor.

As shown in FIG. 1A, the intelligent transportation routing system 104 receives communications via the server(s) 102. In certain embodiments, the server(s) 102 comprise a content server. The server(s) 102 can also comprise a communication server or a web-hosting server. This disclosure describes additional details regarding the server(s) 102 below with respect to FIG. 8. Although not illustrated in FIG. 1A, in some embodiments, the environment 100 may have a different arrangement of components and/or may have a different number or set of components altogether. For example, in some embodiments, the intelligent transportation routing system 104 and the provider client device 116 can communicate directly, bypassing the network 108.

In addition to communicating with the provider client device 116 to receive GPS locations, the intelligent transportation routing system 104 optionally stores data corresponding to each route traveled and each transportation request on a transportation routing database 106 accessed by the server(s) 102. Accordingly, the server(s) 102 may generate, store, receive, and transmit various types of data, including, but not limited to, GPS locations, map-matched locations, location information, price estimates, estimated times of arrival, pickup locations, dropoff locations, and other data stored in the transportation routing database 106. In some such embodiments, the intelligent transportation routing system 104 organizes and stores such data in the transportation routing database 106 by geographic area, requestor, and/or time period.

Transportation providers may generate fixed fares upon receiving a transportation request from a requestor. For example, upon receiving a transportation request for transportation between two locations, the transportation provider may predict a fare for transportation between two locations. In particular, the predicted fare may be based on a predicted route between the two locations (e.g., based on a predicted time and/or distance to travel between the two locations). In addition, the predicted fare may be based on user preferences, such as user preferences for certain types of vehicles.

Figure 1B:
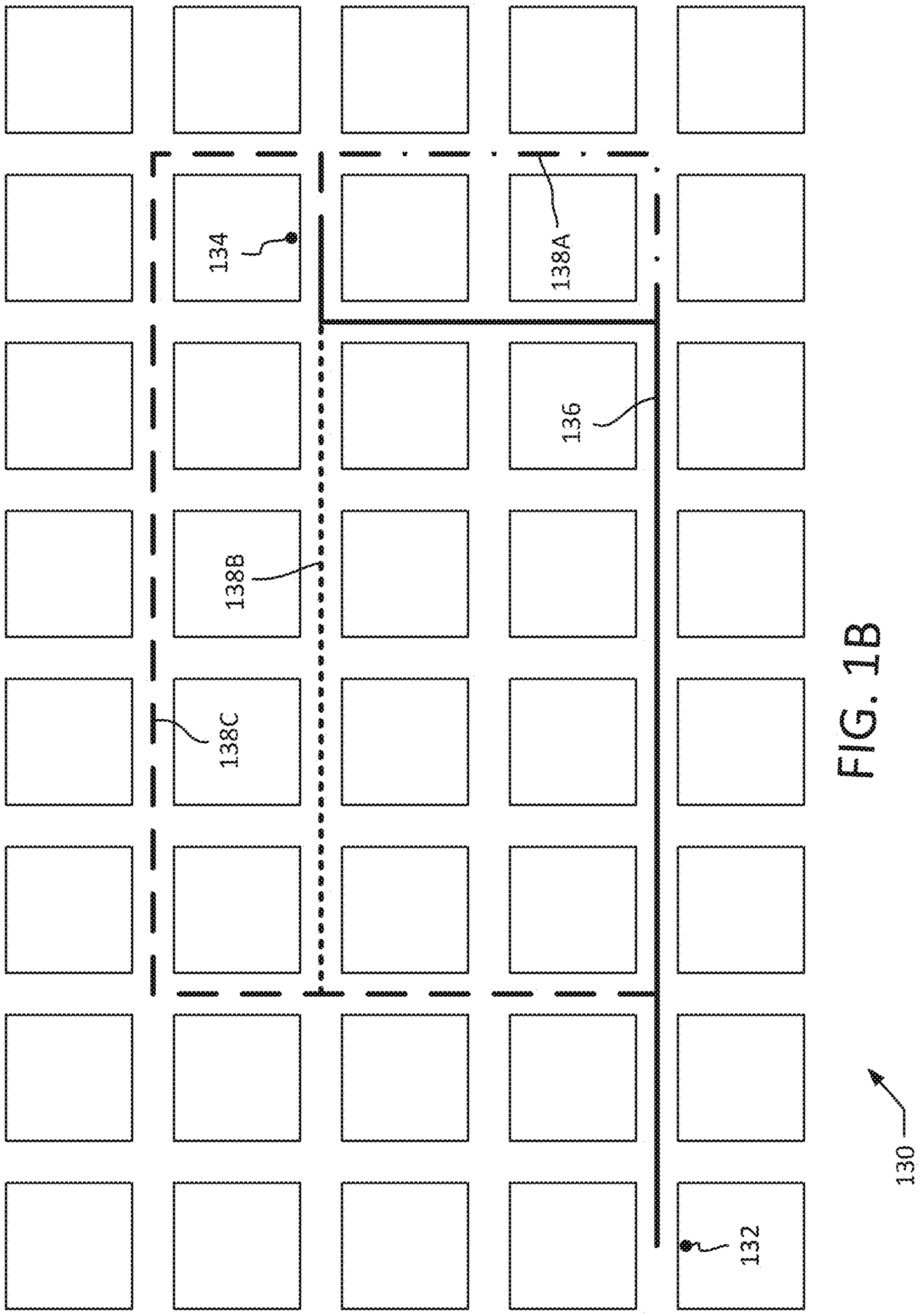
FIG. 1B illustrates a transportation scenario according to an exemplary embodiment of the present disclosure.

In some instances, the predicted route may include one or more inaccuracies. In particular, the initial route prediction may incorrectly estimate the route traveled, and therefore the distance, between the two locations specified in the transportation request. The predicted route may also inaccurately estimate the estimated time of arrival or departure for a vehicle servicing the route, which can alter the total amount of time necessary to fulfill transportation along the route. For example, FIG. 1B depicts a transportation scenario 130 in which an incorrect route may be predicted. The received transportation request may have requested transportation from location 132 to location 134. The initial route prediction may have predicted that the transportation request would be fulfilled by traveling route 136 between the locations, location 132 and location 134. However, alternative transportations routes 138A-C are also possible. Thus, in certain instances, a transportation provider may decide, or be required, to take one of the alternative transportation routes 138A-C. For example, the requestor may request that the transportation provider travel along a preferred one of the alternative routes 138A-C, which is different from the predicted route 136. As another example, an unknown road closure along the route 136 may require the transportation provider to utilize an alternative route 138A-C. As can be readily appreciated based on FIG. 1B, the alternative routes 138A-C may have different travel distances than the route 136 (e.g., alternative route 138C is longer than the route 136). Therefore, an actual distance traveled may differ from a predicted distance traveled.

Figure 2:
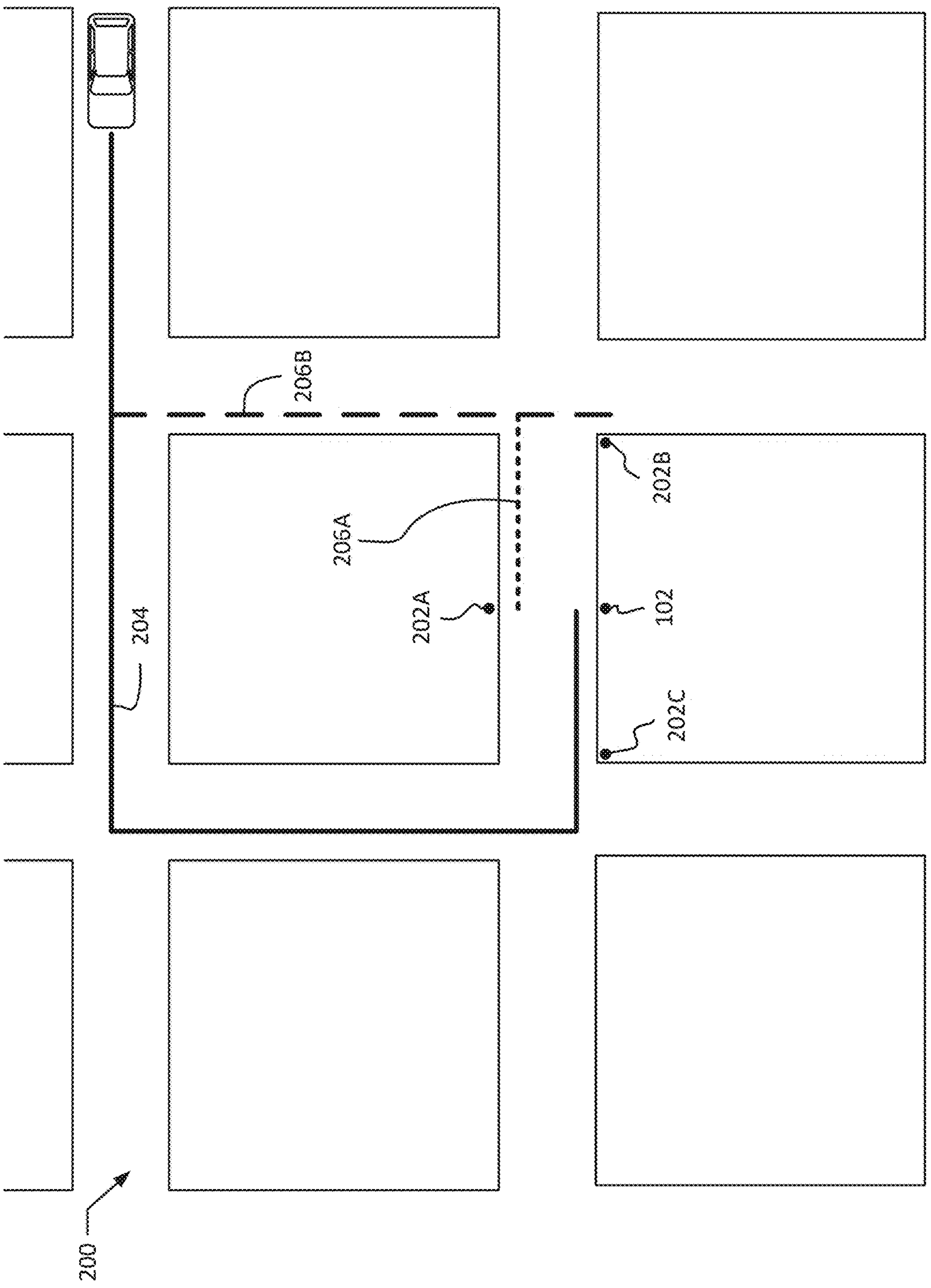
FIG. 2 illustrates a transportation scenario according to an exemplary embodiment of the present disclosure.

As another example, the initial route prediction may inaccurately estimate the actual distance traveled based on inaccurate pickup and/or drop off locations. For example, FIG. 2 depicts a pickup scenario 200 in which a requestor has requested transportation from the location 132. In the pickup scenario 200, the initial route prediction may be based on a route 204, along which a transportation provider is expected to travel to pick up the requestor at the location 132. However, in practice, the requestor may actually located at and therefore picked up at the alternative pickup locations 202A-C. For example, the requestor may be contacted by the transportation provider and requested to move to one of the alternative pickup locations 202A-C (e.g., to avoid traffic, road closures). The requestor may also proceed towards an assigned vehicle upon seeing the vehicle approach the pickup location 132 (e.g., the requestor may walk towards the vehicle to alternative pickup 202C upon seeing it turn the corner). Further, the pickup location 132 may simply be inaccurate (e.g., based on inaccurate location sensor measurements). For example, the requestor may actually be picked up at the alternative pickup location 202A, not location 132. In any of the above scenarios, changes to an alternative pickup location 202A-C may come with corresponding changes to an alternative route 206A-B, or an early termination of the pickup route 204. Additionally, the transportation provider may take a different route to the pickup location 132 or to an alternative pickup location 202A-C (e.g., due to transportation provider preferences or due to a mistake such as a missed turn). The actual distance traveled to pick up the requestor may therefore differ from the predicted distance of the pickup route 204. Similar changes to the drop off location or drop off route may also result in similar changes to the distance traveled.

Relatedly, the initial route prediction may be based on an inaccurate prediction of a transportation time for the transportation request. For example and with reference to FIG. 1B, an alternative route 138A-C taken by a transportation provider may have different traffic (i.e., navigation congestion) than the predicted route 136. Such navigation congestion, combined with the difference in actual distance traveled, may result in a different amount of time spent in transportation. For example, although the alternative route 138C is longer in distance than the route 136, the alternative route 138C may have less navigation congestion and may therefore require less time to travel. In such instances, the distance may be longer and the transportation time may be shorter, resulting in an inaccurate initial route prediction.

A transportation provider, such as a TNC, may be required to compensate a transportation provider for the time and distance required to pick up the requestor from location 132. Therefore, differences in the route and/or location to pick up a requestor may result in more or less time spent travelling to the requestor, which may change the actual route and cost for transportation between the locations 132, 134 and the ultimate accuracy of the initial route prediction, impacting any fixed fare generated by the TNC that were based on the route prediction The time and distance inaccuracies of the routes used to generate the initial route prediction may therefore need to be corrected to properly provide upfront fares to requestors requesting transportation. Certain techniques may involve adjusting a fare multiplier based on previous prediction errors, but such techniques may not be able to accurately improve the upfront fares themselves, and further, lack transparency into the causes of the initial route prediction errors.

Thus, to solve these technical problems, among others, the disclosed system automatically analyzes generated route predictions for inaccuracies in the routes (e.g., time and distance inaccuracies). In particular, the initial route prediction can be compared to completed fares for similar transportation routes that were completed previously. Such a comparison may be performed by a predictive model to analyze how the initial route prediction for the similar transportation routes differ from actual route completed for the actual fare (i.e., the actual fare paid for by the transportation provider). Based on the comparison, a corrected route prediction can be generated for the requested transportation route. The corrected route prediction may identify how the initial route prediction was incorrect (e.g., may identify certain types of errors within the initial route prediction, such as time and distance errors).

Figure 3:
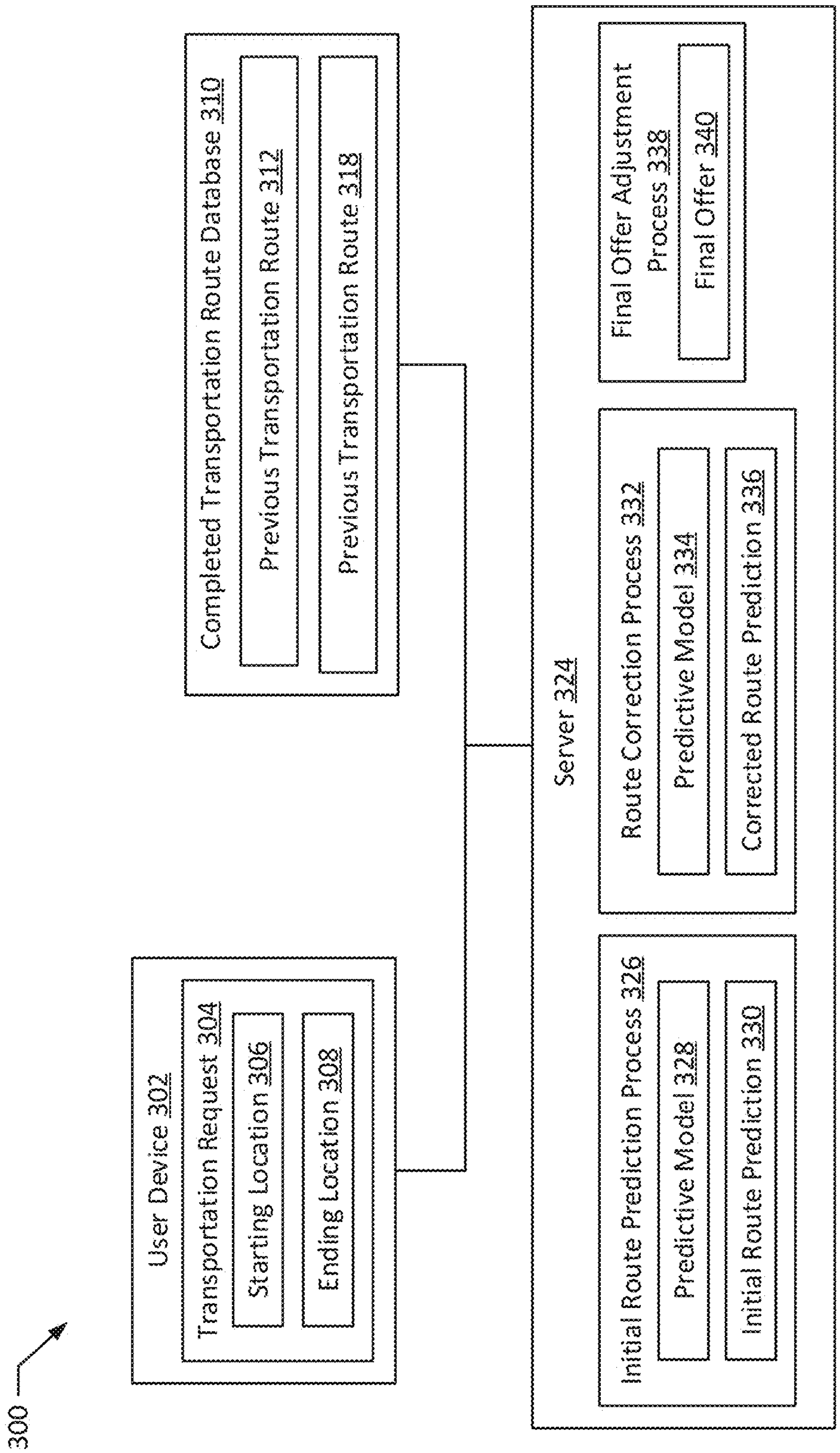
FIG. 3 illustrates a system according to an exemplary embodiment of the present disclosure.

FIG. 3 depicts a system 300 according to an exemplary embodiment of the present disclosure. The system 300 may be configured to predict a transportation route and generate and present an upfront fare to a requestor based on the predicted transportation route. The system 300 includes a user device 302, a completed transportation route database 310, and a server 324. The user device 302 may be configured to generate and transmit transportation requests 304. The transportation request 304 may be generated by an application, such as a transportation network company application, to request transportation from a starting location 306 to an ending location 308. The locations 306, 308 may be specified by, e.g., global positioning system (GPS) or other location coordinates.

Figure 4:
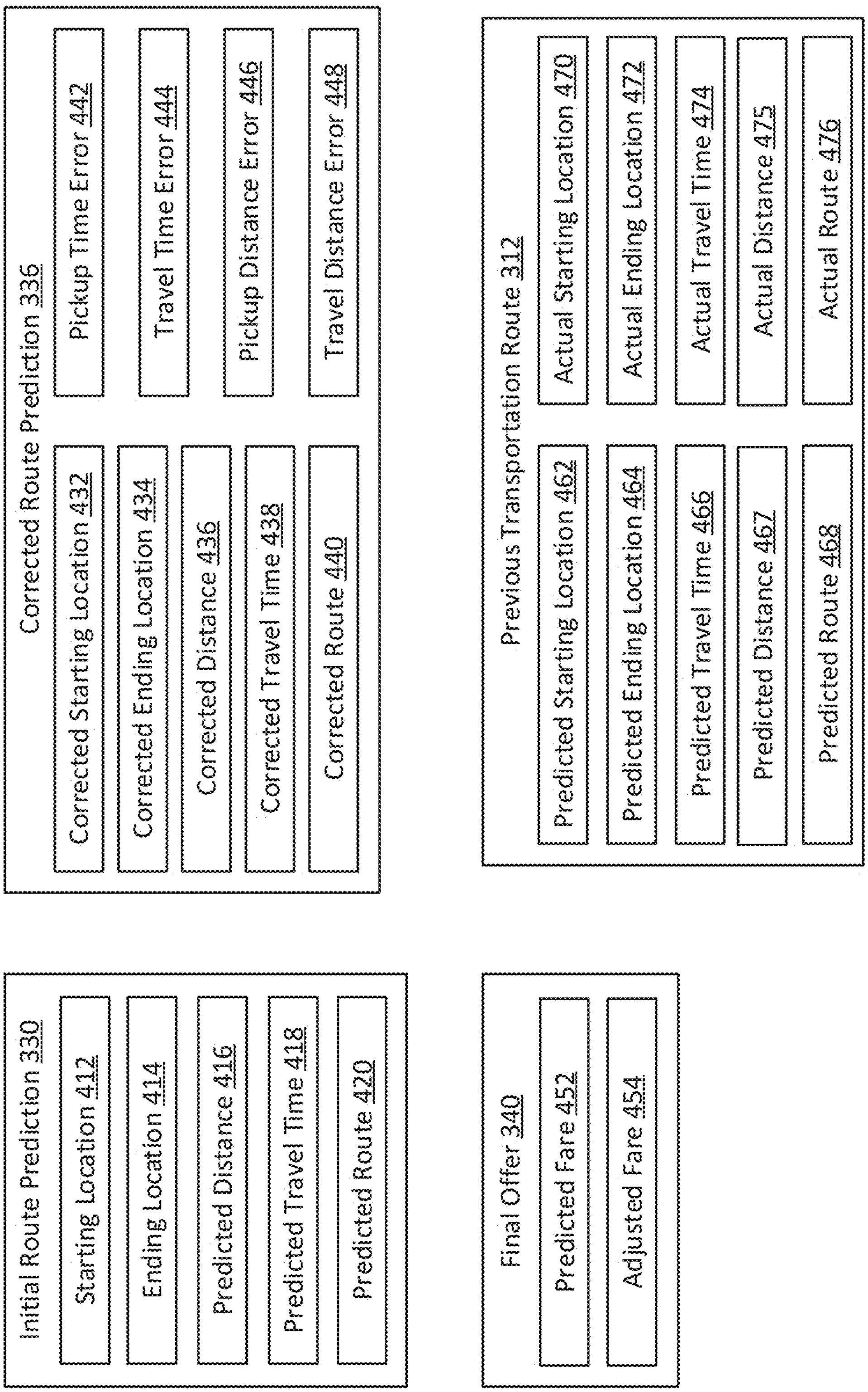
FIG. 4 illustrates an initial route prediction, a corrected route prediction, an upfront fare, and a previous transportation route according to exemplary embodiments of the present disclosure.

The completed transportation route database 310 may contain information on previous transportation routes 312, 318. The previous transportation route 312 may include predicted and actual route information regarding the transportation route performed to fulfill a previously-received transportation request. In particular, and as illustrated in FIG. 4, the predicted route information may include one or more of a predicted starting location 462, a predicted ending location 464, a predicted travel time 466, a predicted distance 467, and a predicted route 468. The predicted route information may correspond to an initial route prediction generated in response to the previously-received transportation request and may have been used to generate and present an upfront fare to a requestor in response to receiving the transportation request.

The actual route information may include one or more of an actual starting location 470, an actual ending location 472, an actual travel time 474, an actual distance 475, and an actual route 476. The actual route information may reflect the actual route taken to fulfill the previously-received transportation request, including any changes to the predicted route 468 taken by a transportation provider, as well as any changes in starting and ending locations and the distance and travel time required to complete the transportation request. In certain implementations, after fulfilling the previously-received transportation request, the server 324 may store the predicted route information and the actual route information as the previous transportation route 312 in the completed transportation route database 310. Although not depicted, the previous transportation route 318 may include information and data similar to the information and data of the previous transportation route 312. The previous transportation routes 312, although not depicted, may also store information regarding the estimated time of arrival and/or departure along with the actual time of arrival or departure. These may be compared to estimated times of arrival and/or departure of the initial route prediction 330 and the corrected route prediction 336 to identify corresponding errors in each.

Referring again to FIG. 3, the server 324 may be configured to generate an upfront fare 340 for presentation to the requestor device 302, in response to received transportation requests 304. In particular, the server 324 may implement an initial route prediction process 326, which when executed, generates an initial route prediction 330. Additionally, the server 324 may implement a route correction process 332, which when executed, generates a corrected route prediction 336 based on the initial route prediction 330. The server 324 may further include an upfront fare adjustment process 338 to generate an upfront fare 340 based on the corrected route prediction 336.

The initial route prediction process 326 may be configured to receive the starting location 306 and the ending location 308, specified in a transportation request 304, to generate an initial route prediction 330 between the starting location 306 and the ending location 308. For example and with reference to FIGS. 1 and 3, the initial route prediction process 326 may generate the initial route prediction 330 predicting the initial route 136 between locations 132 and 134.

To generate the initial route prediction 330, the predictive model 328 may process information indicative of routes traveled for transportation between the starting location 306 and the ending location 308. For example, the predictive model 328 may analyze previous transportation routes 312, 318 that are similar to the starting location 306 and/or ending location 308 used to generate the initial route prediction 330. The “similar” previous transportation routes 312, 318 (i.e., routes that are similar to the initial route prediction 330) may be identified by examining the actual route information stored by and/or within the previous transportation routes 312, 318. For example, the initial route prediction process 326 may identify previous transportation routes 312, 318, as being similar to the initial route prediction 330, because the previous transportation routes 312, 318 include actual starting locations 470 that are near the starting location 306 and/or actual ending locations 472 that are near the ending location 308. For example, a previous transportation route 312, 318 may be identified as similar if the actual starting location 470 is within a threshold distance of the starting location 306 of the transportation request 304. Similarly, a previous transportation route 312, 318 may be identified as similar if the actual ending location 472 is within a threshold distance of the ending location 308 of the transportation request 304. In certain implementations, the threshold distance may be, e.g., 10 feet, 100 feet, 1 block, or more. In still further implementations, the threshold distance may vary or dynamically updated based on the number of previous transportation routes 312 with actual starting locations 470 and/or actual ending locations 472 that are respectively near the starting location 306 and the ending location 308. For example, if there are a small number of such previous transportation routes 312, 318, the threshold distance may be set higher (e.g., so the initial route prediction process 326 has sufficient previous transportation routes 312, 318 for comparison). On the other hand, if there are many such previous transportation routes 312, 318, the threshold distance may be set lower (e.g., so the initial route prediction process relies only on the previous transportation routes 312, 318 that are most similar). In still further implementations, the predictive model 328 may be trained to identify which previous transportation routes 312, 318 qualify as sufficiently similar for generating the initial route prediction 330. Additionally, the previous transportation route 312, 318 may store indications of the starting and ending locations in an associated, previously-received transportation request. In such a scenario, the initial route prediction process 326 may identify previous transportation routes 312, 318 as “similar”, because the previous transportation routes 312, 318 share similar requested starting and ending locations (e.g., with “similar” determined with criteria analogous to those discussed above regarding the actual route information of the previous transportation routes 312, 318).

In performing the comparison, the initial route prediction process 326 may weight or otherwise combine information stored within the corresponding previous transportation routes 312, 318. For example, as depicted in FIG. 4, the previous transportation route 312 may store an actual travel time 474, an actual distance 475, and an actual route 476. The initial route prediction process 326 may compare the actual travel times 474 across the previous transportation routes 312, 318 that are similar. For example, the initial route prediction process 326 may compare the actual travel times 474 to identify a range of typical travel times likely between the starting location 306 and the ending location 308. The initial route prediction process 326 may also compare the actual distances 475 of the previous transportation routes 312, 318 that are similar. For example, the initial route prediction process may compare the actual distances 475 to identify a range, or one or more distance thresholds, of typical travel distances likely between the starting location 306 and the ending location 308. In certain implementations, the predictive model 328 may be trained to perform these comparisons (e.g., by combining or otherwise processing corresponding previous transportation routes 312. Similarly, the initial route prediction process 326 may analyze the actual routes 475 indicated by the previous transportation route 312 to generate the predicted route 420. In certain implementations, the initial route prediction process 326 may give more weight or influence to previous transportation routes 312, 318 that are more similar to the received transportation request 304.

As shown in FIG. 4, the initial route prediction 330 may be generated to include a starting location 412 and an ending location 414. In certain implementations, the starting location 412 and the ending location 414 may be the same as the starting location 306 and the ending location 308. In other implementations, the initial route prediction process 326 may be configured to make an initial estimate of alternative pickup locations 202A-C or drop off locations and the starting location 412 and ending location 414 may therefore differ from the starting location 306 and the ending location 308.

The initial route prediction 330 may also include one or more of a predicted distance 416, a predicted travel time 418, and a predicted route 420. The predicted route 420 may represent the initial estimate (e.g., time and distance) for transportation between the starting location 412 and the ending location 414. The predicted route 420 may be stored as, e.g., coordinates indicating the path covered by a vehicle transporting a requestor along the predicted route 420. In certain implementations, the predicted distance 416 may be calculated based on the predicted route 420, e.g., by calculating a total distance covered by a vehicle transporting a requestor along the predicted route 420. Similarly, the predicted travel time 418 may be calculated based on the predicted route 420, e.g., an estimated amount of time for a vehicle to transport a requestor along the predicted route 420. In other implementations, the predicted travel time 418 may be calculated at least in part based on the similar previous transportation routes 312, 318 (e.g., based on the actual travel time 474).

In certain implementations, the initial route prediction 330 may be generated by a predictive model, such as the predictive model 328. For example, the predictive model 328 may be configured to identify and compare the similar previous transportation route 312, 318. In particular, the predictive model 328 may be trained to generate the initial route prediction 330 based on the received transportation request 304. For example, the predictive model 328 may be trained to generate the initial route prediction 330 by identifying previous transportation routes 312, 318 that are similar to the transportation request 304 (e.g., previous transportation routes 312, 318 that involve transportation between locations similar to the starting location 306 and/or ending location 308). In particular, the predictive model 328 may be trained on training data specifying (i) starting and ending locations 306, 308 for a particular previous transportation route 312, 318 and (ii) actual route information for the previous transportation route 312, 318. The predictive model 328 may be trained to generate initial route predictions 330 that are feasible, but these initial predictions may not always accurately represent, e.g., in distance or in time, the actual routes taken to fulfill transportation requests 304.

The inaccuracies of the initial route predictions 330 may result from the configuration of the prediction model 328. For example, the predictive model 328 may be configured to generate the initial route prediction 330 to meet a minimum accuracy threshold based on the previous transportation routes 312, 318 under certain performance constraints (e.g., time or computing resource constraints). Therefore, the initial route prediction 330 may be primarily generated to provide an initial estimate of the time and distance required for transportation from the starting location 306 to the ending location 308.

The route correction process 332 may therefore be configured to generate a corrected route prediction 336 based on the initial route prediction 330 and the transportation request 304. For example, the route correction process 332 may receive the initial route prediction 330 and the transportation request 304. The route correction process 332 may compare the initial route prediction 330 with previous transportation routes 312, 318 that are similar to the transportation request 304 to identify one or more errors in the initial route prediction 330. As discussed above, similar previous transportation routes 312, 318 may be identified from the completed transportation route database 310 based on an actual starting location 470 and/or an actual ending location 472 that are located near the starting location 306, 412 and/or the ending location 308, 414. However, the route correction process 332 may further identify previous transportation routes 312, 318 as being similar, if the previous transportation routes 312, 318 contain predicted route information that is similar to the initial route prediction 330 (e.g., where "similar" previous transportation routes 312, 318 are identified using criteria similar to those discussed above, but applied to predicted route information). In particular, the route correction process 332 may identify previous transportation routes 312, 318 with predicted starting locations 462 that are similar to the starting location 412 of the initial route prediction 330 and/or with predicted ending locations 464 that are similar to the ending location 414 of the initial route prediction 330.

Additionally or alternatively, similar previous transportation routes 312, 318 may be identified that have a predicted route 468, a predicted travel time 466, and/or a predicted distance 467, any one of which may be similar to the predicted route 468, the predicted travel time 418, and/or the predicted distance 416. In particular, the route correction process 332 may determine a level of similarity between the previous transportation routes 312, 318, and the initial route prediction, and may select the previous transportation routes 312, 318 with a similarity measure above a certain threshold as the similar previous transportation routes 312, 318. Relatedly, the route correction process 332 may select a certain number or certain proportion of the previous transportation routes 312, 318 (e.g., 100, 1,000, or more routes, or the most similar 1%, 5%, 10% of routes), and consider such selected routes as previous transportation routes that are similar to the initial route prediction. By incorporating the predicted route information when identifying similar previous transportation routes, the route correction process 332 may identify different routes than those utilized by the initial route prediction process (e.g., routes that were predicted to start near a location 132 but actually started near an alternative location 202A-C, or routes that were predicted to follow a certain route 136 but did not).

Once similar previous transportation routes 312 are identified, the route correction process 332 may compare the similar previous transportation routes 312, 318 to generate the corrected route prediction 336. For example, the route correction process 332 may perform the comparison to generate the corrected route prediction 336 by weighting or otherwise combining information from the previous transportation routes 312, 318 that most closely resemble the initial route prediction 330. For example, the route correction process 332 may combine information regarding the actual route 476, the actual distance 475, the actual travel time 474, the actual ending time 472, and the actual starting location 470 from the similar previous transportation routes 312, 318 to generate the corrected route prediction 336. In particular, the route correction process 332 may give a higher weight the actual information from previous transportation routes 312, 318 with one or more similar pieces of predicted route information 462, 464, 466, 467, 468 with the initial route prediction 330.

The corrected route prediction 336 may be generated to include one or more corrected pieces of information from the initial route prediction 330. For example, as depicted in FIG. 4, the corrected route prediction 336 may include one or more of a corrected starting location 432, a corrected ending location 434, a corrected distance 436, a corrected travel time 438, and/or a corrected route 440. These corrected pieces of information may respectively represent corrected forms of the starting location 412, the ending location 414, the predicted distance 416, the predicted travel time 418, and the predicted route 420 determined based on the similar previous transportation routes 312, 318. For example, if the route correction process 332 determines that the starting location 412 is unlikely to be the actual starting location of the transportation route (e.g., because the similar previous transportation routes 312, 318 indicate that one or more alternative locations 202A-C are more likely), the route correction process 332 may generate a corrected starting location 432 indicating the more likely starting location of the transportation route. The route correction process 332 may similarly generate a corrected ending location 434 upon determining, based on the similar previous transportation routes 312, 318, that the ending location 414 is unlikely to be the ending location of the transportation route. The corrected distance 436 may also be generated if the route correction process 332 determines that the predicted distance 416 is unlikely to be the actual distance traveled fulfilling the transportation request 304. For example, if the similar previous transportation routes 312, 318 indicate that transportation between the locations 412, 414 typically result in detours (e.g., around traffic or other road conditions), the actual routes taken may differ, causing a change in the actual distance traveled. The route correction process 332 may therefore generate, based on the similar previous transportation routes 312, 318, the corrected distance 436 to accurately represent the most likely distance traveled on the transportation route. Additionally or alternatively, changes to the starting location 412 in the ending location 414 indicated by the corrected starting location 432 in the corrected ending location 434 may also result in changes to the distance traveled, necessitating a corrected distance 436. For example, if the corrected ending location 434 and the corrected starting location 432 are further apart than the starting location 412 and the ending location 414, the actual distance traveled between the corrected starting location 432 and the corrected ending location 434 may increase relative to the predicted distance 416. Therefore, a corrected distance 436 may be necessary that reflects the correct, longer distance.

In some instances, the route correction process 332 may also generate a corrected route 440, where a change in route 136 to an alternative route 138A-C is likely based on the similar previous transportation routes 312, 318. Furthermore, based on any of the above changes and/or after determining, based on the similar previous transportation routes 312, 318, that road conditions or other circumstances are likely to result in a change in travel time from the predicted travel time 418, the route correction process 332 may generate a corrected travel time 438. Depending on the accuracy of the initial route prediction 330, the corrected route prediction 336 may only include one or a subset of corrected pieces of information 432, 434, 436, 438, 440. In particular, if one or more pieces of information contained within the initial route prediction 330 are determined (e.g., based on the similar previous transportation routes 312, 318) to be correct, the correct information may be included in its original form within the corrected route prediction 336. For example, both the starting and ending locations 412, 414 may be correct, but the route taken between the starting and ending locations 412, 414 may differ. In such an instance, the starting and ending locations 412, 414 may be included within the corrected route prediction 336, while the corrected route 440 indicates the more likely route, along with the appropriate corrected distance 436 and corrected travel time 438 as needed based on the corrected route 440.

In certain implementations, the corrected route prediction 336 may be generated by a predictive model, such as the predicted model 334. For example, the predictive model 334 may be trained to identify, based on predicted route information, similar previous transportation routes 312, 318 within the completed transportation route database 310 and/or to analyze the previous transportation routes 312, 318 according to one or more of the techniques discussed above. In particular, the predictive model 334 may be trained to perform one or more of the operations discussed on all or a subset of the data within the completed transportation route database 310.

For example, the predictive model 334 may be trained by receiving: 1) one or more pieces of predicted route information corresponding to the types of information included in the initial route prediction 330; and 2) actual route information corresponding to actual routes taken for previously-predicted trips. In particular, the predicted starting location 462 may correspond to a starting location 412 generated by the initial route prediction process 326 and the predicted ending location 464 may correspond to an ending location 414 generated by the initial route prediction process 326. Similarly, the predicted travel time 466, the predicted distance 467, and the predicted route 468 may correspond to the predicted distance 416, the predicted travel time 41A, and the predicted route 420 from an initial route prediction 330 generated for a previously-completed transportation request. The predicted route information may be compared to the actual route information 470, 472, 474, 475, 476 during training to identify how initial route predictions 330 generated by the initial route prediction process 326 typically differ from the actual routes taken. The predictive model 334 may then be trained to generate the corrected route prediction 336 to correct these errors and thereby generate a prediction that more closely corresponds to the actual transportation route taken to fulfill the previous transportation requests. Furthermore, the predictive model 334 may be trained to incorporate additional types of information, such as the time of day or week at which a transportation request 304 is received, current weather conditions, current traffic conditions, current nearby events, and/or current overall marketplace conditions nearby on a transportation platform provided by the transportation provider (e.g., ridership levels as compared to current capacity for nearby vehicles).

The corrected route prediction 336 may also be generated to specify one or more types of errors in the initial route prediction 330. In particular, the corrected route prediction 336 may include one or more of a pickup time error 442, a travel time error 444, a pickup distance error 446, and a travel distance error 448. The pickup distance error 446 may be generated when the starting location 412 generated by the initial route prediction process 326 differs from the corrected starting location 432. The locations 412, 432 may differ by a certain distance, which may be specified by the pickup distance error. The pickup time error 442 may be calculated in similar situations and may reflect the difference in time required to pick up a requestor given the difference between the corrected starting location 432 and the starting location 412, as in the scenario 200. The travel distance error 448 may be generated when the corrected distance 436 differs from the predicted distance 416 (e.g., because the corrected route 440 differs from the predicted route 420). The travel distance error 448 may indicate an amount by which the distances 416, 436 differ. The travel time error 444 may be generated when the corrected travel time 438 differs from the predicted travel time 318 (e.g., because the corrected route 440 differs from the predicted route 420, because traffic or other road conditions alter the expected travel time along the predicted route). In certain implementations, the route correction process 332 may calculate the errors 442, 444, 446, 448 based on the one or more pieces of corrected information 432, 434, 436, 438, 440. For example, the predictive model 334 may be trained to generate the corrected information 432, 434, 436, 438, 440, which are then utilized by the route correction process 332 (e.g., heuristics included within the route correction process 332) to generate the errors 442, 444, 446, 448.

In other implementations, the predictive model 334 may directly predict the errors 442, 444, 446, 448 based on the initial route prediction 330 and the transportation request 304. For example, the predictive model 334 may be trained to predict the corrected information 432, 434, 436, 438, 440 and the errors 442, 444, 446, 448 during the same process. In still further implementations, the predictive model 334 may not directly determine the corrected information 432, 434, 436, 438, 440 and may instead only be trained to predict the errors 442, 444, 446, 448. In such implementations, the corrected information 432, 434, 436, 438, 440 may not be included in the corrected route prediction 336.

Although the initial route prediction process 326 and the route correction process 332 may each be implemented at least in part by predictive models 328, 334, these predictive model 328, 334 may be configured differently. For example, the predictive model 328 may be trained to make a different prediction from the predictive model 334. In particular, the predictive model 328 may be configured to generate an initial, feasible prediction of a route 136 connecting the starting location 306 to the ending location 308, along with associated time and distance estimates. Further, to reduce processing time, data inputs to the predictive model 328 may be comparatively limited (e.g., the predictive model 328 may only consider the transportation request 304 and previous transportation routes 312, 318).

However, because the predictive model 334 receives the initial route prediction 330, the predictive model 334 may instead be directed to refining and correcting the initial route 136 predicted by the predictive model 328. Because of this, the predictive model 334 may consider additional data inputs from those available to the predictive model 328 (e.g., the predicted route information from the previous transportation routes 312, 318, weather information, traffic and road conditions) without suffering unacceptable performance delays. Furthermore, because the route correction process 332 is configured to incorporate predicted route information stored in the previous transportation routes 312, 318, the predictive model 334 may be separately trained to incorporate and adjust for idiosyncrasies of the predictive model 328. For example, the predictive model 328 may regularly make certain types of mistakes (e.g., in placing the starting location 412 in the ending location 414, or failing to account for differences in travel time in certain areas due to traffic and other road conditions). Because the predictive model 334 may be trained to incorporate the specifics of the initial route prediction 330 and previous predicted route information generated by the initial route prediction process 326, the predictive model 334 may resolve these systemic inaccuracies without having to resort to more complex models or prediction processes.

Such a two-tiered approach to route prediction may both reduce the computing resources required and also reduce processing time, thereby increasing accuracy while also enabling timely responses to transportation requests 304. For example, in certain implementations, if a single predictive model were configured to incorporate the data inputs of both the predictive model 328 and the predictive model 334, the predictive model may be too resource intensive to generate route predictions in time to present the upfront fare 340 to the user device 302. Therefore, by utilizing two predictive models 328, 334 to first generate an initial route prediction 330 and then refine and correct that prediction to generate a corrected route prediction 336, the server 324 may be able to receive and process transportation requests 304 with more accurate route predictions without utilizing excessive computing resources or sacrificing system responsiveness for the system 300.

In certain implementations, the predictive models 328, 334 may be implemented as one or more machine learning models, including supervised learning models, unsupervised learning models, and other types of machine learning models. For example, the predictive models 328, 334 may each be implemented as one or more of a regression model, a neural network, a decision tree model, a support vector machine, and a Bayesian network. In certain implementations, the predictive model 328 and the predictive model 334 may be implemented as different types of machine learning models. However, in other implementations, the predictive models 328, 334 may both be implemented as regression models.

The upfront fare adjustment process 338 may receive the corrected route prediction 336 and may generate an upfront fare 340 for presentation to the user device 302. For example, as shown in FIG. 4, the upfront fare 340 may include a predicted fare 452. The predicted fare 452 may be generated based on the corrected distance 436 and corrected travel time 438 indicated in the corrected route prediction 336. The predicted fare 452 may be adjusted to account for one or more customer or business-related factors, as discussed above. For example, a requestor associated with the user device 302 may be a frequent customer of the transportation provider implementing the server 324 and the adjusted fare 454 may be generated to provide the requestor with a discount. In another example, the corrected route 440 may result in the vehicle providing the transportation ending in a location with minimal transportation demand, in which case the adjusted fare 454 may be generated to account for the cost of returning the vehicle to an area with sufficient transportation demand. Once generated, the upfront fare 340 may be transmitted to the user device 302 for presentation to the requestor (e.g., via an application provided by the transportation provider).

One or more of the user device 302, the completed transportation route database 310, and the server 324 may be implemented by a computing system. For example, although not depicted, one or more of the user device 302, the completed transportation route database 310, and the server 324 may include a processor and a memory that implement at least one operational feature. For example, the memory may contain instructions which, when executed by the processor, cause the processor to implement at least one operational feature of the user device 302, the completed transportation route database 310, and/or the server 324.

It should also be appreciated that, although embodiments of the previous transportation routes 312, the initial route prediction 330, the corrected route prediction 336, and the upfront fare 340 depicted in FIG. 4 were discussed above, additional or alternative implementations may be possible and are hereby contemplated. For example, in certain implementations, one or more of the previous transportation route 312, the initial route prediction 330, the corrected route prediction 336, and the upfront fare 340 may include additional pieces of information, may exclude certain pieces of information, or both.

Figure 5:
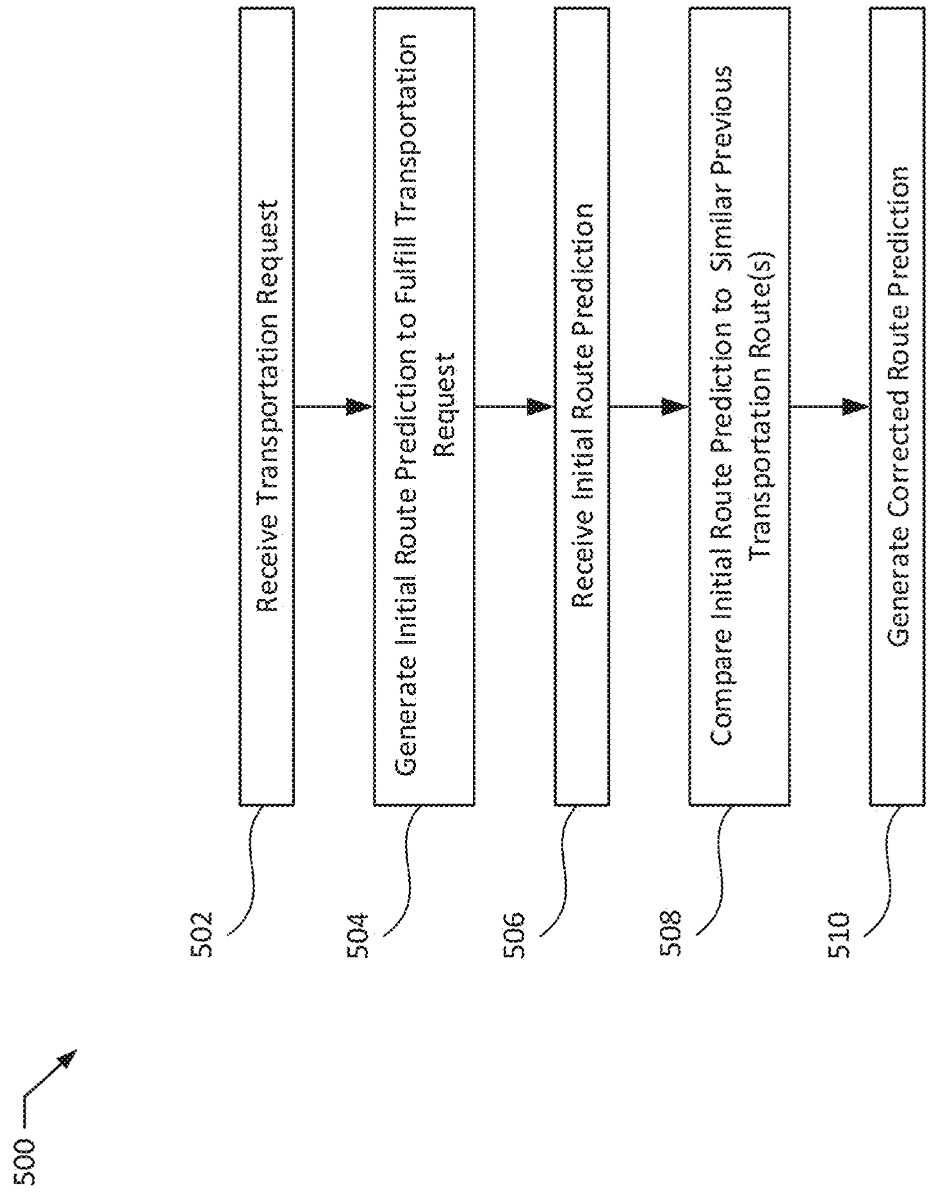
FIG. 5 illustrates a method according to an exemplary embodiment of the present disclosure.

FIG. 5 depicts a method 500 according to an exemplary embodiment of the present disclosure. The method 500 may be performed to receive and process transportation requests 304, e.g., to predict transportation routes for fulfilling transportation requests 304. The method 500 may be implemented on a computer system, such as the system 300. For example, method 500 may be implemented by the server 324 and/or the completed transportation route database 310. The method 500 may also be implemented by a set of instructions stored on a computer readable medium that, when executed by a processor, cause the computer system to perform the method. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 may begin with the server 324 receiving a transportation request 304 (block 502). The transportation request 304 may be received from a requestor and may request transportation from a starting location 306 to an ending location 308. The server 324 may then generate an initial route prediction 330 for fulfilling the transportation request 304 (block 504). For example, the initial route prediction process 326 may generate an initial route prediction 330 including a predicted route 420 between the starting location 306 to the ending location 308. As explained above, the initial route prediction 330 may be generated at least in part using a predictive model 328 and may include one or more route inaccuracies (e.g., time and or distance inaccuracies). In certain implementations, block 502 may be optional. For example, rather than receiving the transportation request 304 at block 502 and generating the initial route prediction 330 at the server, block 504 may be performed at least in part by a mobile device associated with the requestor.

The server 324 may then receive the initial route prediction 330 (block 506). For example, the route correction process 332 may receive the initial route prediction 330 from the initial route prediction process 326 for correction. The route correction process 332 may then compare the initial route prediction to similar previous transportation routes 312, 318 (block 508). For example, the route correction process 332 may compare predicted route information 412, 414, 416, 418, 420 from the initial route prediction 330 with information from the similar previous transportation routes 312 (e.g., a second set of similar previous transportation routes 312 at least partially different from the previous transportation routes 312 used to generate the initial route prediction 330). In particular, the similar previous transportation routes 312, 318 may be identified by comparing the predicted route information 412, 414, 416, 418, 420 from the initial route prediction 330 with predicted route information 462, 464, 466, 467, 468 from the previous transportation route 312. The route correction process 332 may then identify one or more errors in the initial route prediction 330 requiring correction. For example, one or more of the starting location 412, the ending location 414, the predicted distance 416, the predicted travel time 418, and the predicted route 420 may be incorrect based on the comparison to the similar previous transportation routes 312, 318.

The server 324 may therefore generate a corrected route prediction 336 (block 510). For example, for each of the errors identified at block 508, the route correction process 332 may generate corrected information 432, 434, 436, 438, 4404 inclusion within the corrected route prediction 336. Additionally or alternatively, the route correction process 332 may generate one or more of a pickup time error 442, a travel time error 444, a pickup distance error 446, and a travel distance error 448 identifying corresponding errors in the initial route prediction 330, as discussed above. In certain implementations, the corrected route prediction 336 may also include an amount of error for each type of error 442, 444, 446, 448. As discussed above, one or both of blocks 508, 510 may be implemented by the predictive model 334, which may be trained to identify and correct common errors within the predictive model 328. Further, the predictive model 334 may be trained to consider additional types of information, such as weather conditions along the predicted route 420 and/or the corrected route 440, a time of the day or week at which the transportation request 304 is to be fulfilled, and/or traffic and road conditions along the predicted route 420 and/or the corrected route 440. Accordingly, the corrected route prediction 336 may represent a more accurate estimation of the transportation route required to fulfill the transportation request 304.

In certain implementations, the corrected route prediction 336 may then be processed by the upfront fare adjustment process 338 to generate an upfront fare 340 for presentation to the user device 302 in response to the received transportation request 304. Based on the upfront fare 340, a requestor associated with the user device 302 may then accept or deny transportation services from the transportation provider implement in the server 324. In still further implementations, the corrected route prediction 336 may not be used to generate the upfront fare 340, but may instead be used to further train or refine the predictive model 334, as discussed further below.

Figure 6:
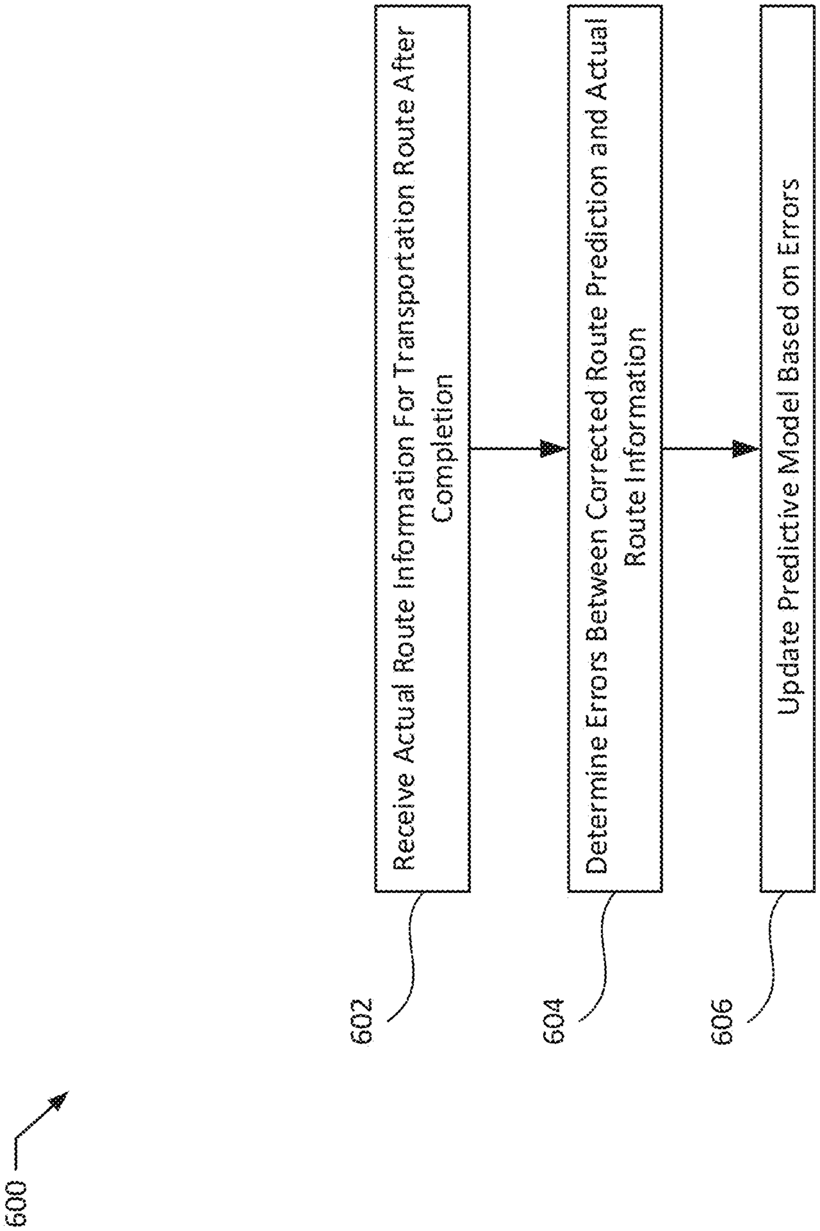
FIG. 6 illustrates a method according to an exemplary embodiment of the present disclosure.

FIG. 6 depicts a method 600 according to an exemplary embodiment of the present disclosure. The method 600 may be performed to train the predictive model 334 of the route correction process 332 based on actual route information for completed transportation routes. The method 600 may be implemented on a computer system, such as the system 300. For example, the method 600 may be implemented by the server 324 and/or the completed transportation route database 310. The method 600 may also be implemented by a set of instructions stored on a computer readable medium that, when executed by a processor, cause the computer system to perform the method. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 may begin with receiving actual route information corresponding to the transportation route after completion (block 602). For example, after generating the corrected route prediction 336, a requestor may accept the upfront fare 340 presented in response to the transportation request 304. The transportation provider may then proceed with fulfilling the transportation request (e.g., by transporting the requestor using one or more vehicles such as cars, scooters, and bicycles). During fulfillment of the transportation request, the server 324 may collect actual route information regarding the transportation route taken. For example, the server 324 may collect one or more of an actual starting location 470, an actual ending location 472, an actual travel time 474, an actual distance 475, and an actual route 476, similar to those above in connection with the previous transportation route 312.

The server 324 may then determine errors between the corrected route prediction 336 and the actual route information 470, 472, 474, 475, 476 (block 604). For example, the server 324 may identify one or more discrepancies between items of the corrected route information 432, 434, 436, 438, 440 and the corresponding pieces of actual route information 470, 472, 474, 475, 476. These differences may be identified as errors for training purposes. Based on these errors, the predictive model 334 may be updated (block 606). For example, during a training procedure of the predictive model 334, the corrected information 432, 434, 436, 438, 440 and the actual route information 470, 472, 474, 475, 476 may be provided along with the identified errors. The predictive model 334 may then be updated during the training process (e.g., by adjusting one or more weights, inputs, or other configuration settings of the predictive model 334).

By performing the method 600, the predictive model 334 may be self-correcting and may improve in accuracy over time. For example, performing the method 600 may enable the predictive model 334 to identify and learn from previous mistakes by adjusting the configurations of the predictive model 334 to account for these mistakes. Similarly, in certain implementations, the method 600 may be used to initially train the predictive model 334. For example, where the absolute accuracy of the predictive model 334 may be in doubt, the method 500 may be performed to generate a corrected route prediction 336 for incoming transportation requests 304, but the corrected route prediction 336 may not be used for generation of the upfront fare 340. Rather, the corrected route prediction 336 may be stored and subsequently compared with actual route information collected during fulfillment of the received transportation requests 304 for training purposes according to the method 600. This process may be repeated until the predictive model 334 is trained sufficiently to generate corrected route predictions 336 accurate enough to form the basis for an upfront fare 340.

In still further implementations, the corrected route prediction 336 may similarly be used to train the predictive model 328. For example, after the corrected route prediction 336 is generated, the corrected route prediction 336 may be provided to the predictive model 328, which may compare the corrected route prediction 336 to the initial route prediction 330 and identify one or more errors in the initial route prediction 330 based on the corrected route prediction 336. The predictive model 328 may then be updated to account for the identified errors, similar to updating the predictive model 334 at block 606.

Embodiments of the present disclosure may comprise or utilize a special purpose or general-purpose computer including computer hardware, such as, for example, one or more processors and system memories, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
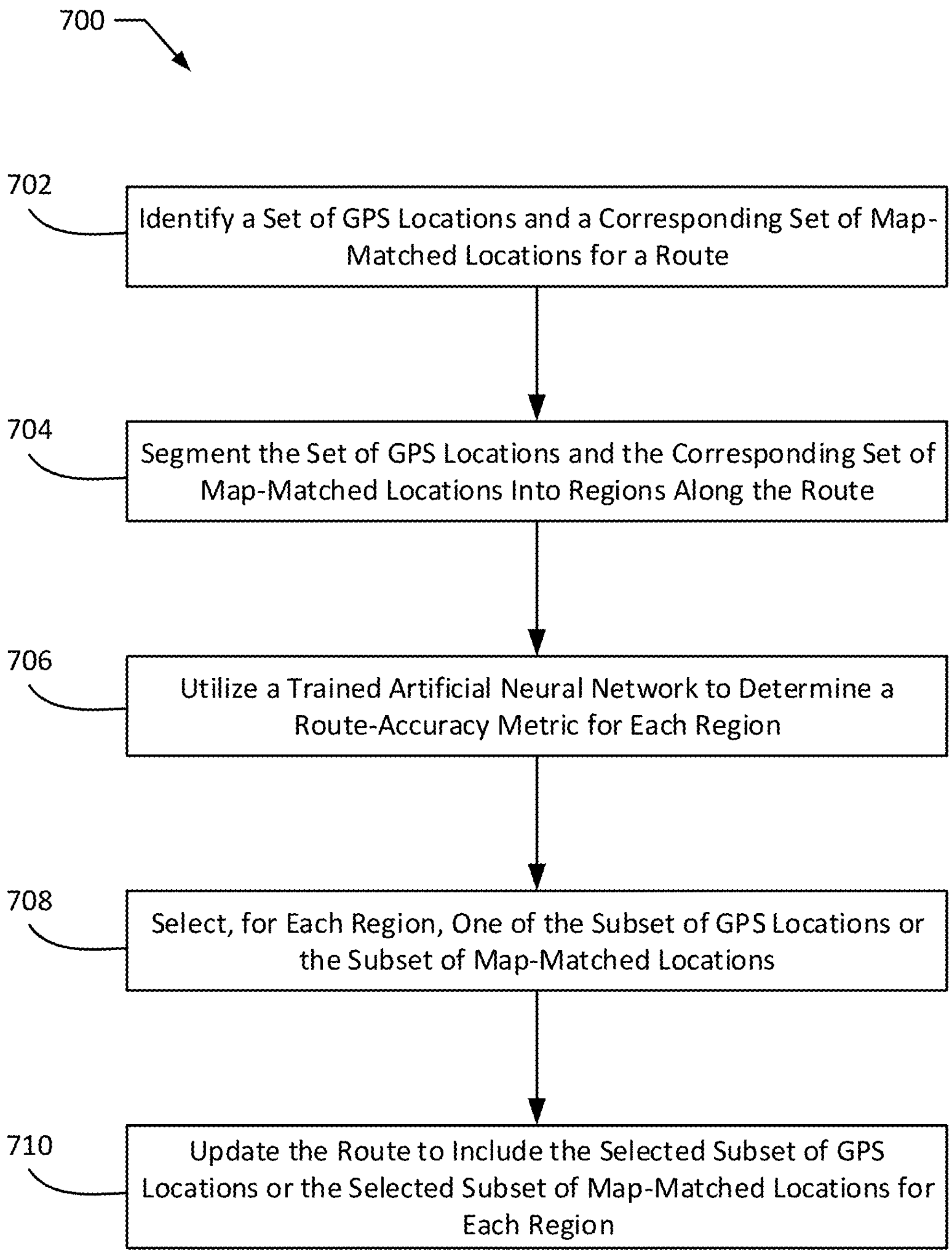
FIG. 7 illustrates a method according to an exemplary embodiment of the present disclosure.

Turning now to FIG. 7, this figure illustrates a flowchart of a series of acts 700 of using an artificial neural network to determine route-accuracy metrics for regions along a route (e.g., an actual route) traveled by a client device in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable storage medium can comprise instructions that, when executed by one or more processors, cause a computing device to perform the acts depicted in FIG. 7. In still further embodiments, a system can perform the acts of FIG. 7.

As shown in FIG. 7, the acts 700 include an act 710 of identifying a set of GPS locations and a corresponding set of map-matched locations for a route. For example, in some embodiments, the act 710 includes identifying a set of GPS locations and a corresponding set of map-matched locations for a route traveled by a client device. In certain implementations, the client device is associated with a transportation vehicle.

As further shown in FIG. 7, the acts 700 include an act 720 of segmenting the set of GPS locations and the corresponding set of map-matched locations into regions along the route. For instance, in certain embodiments, the act 720 includes segmenting the set of GPS locations and the corresponding set of map-matched locations into one or more regions along the route, wherein each region of the one or more regions comprises a subset of GPS locations and a subset of map-matched locations.

As further shown in FIG. 7, the acts 700 include an act 730 of utilizing a trained artificial neural network to determine a route-accuracy metric for each region. As noted above, the route-accuracy metric may take a variety of forms. For example, in some embodiments, the route-accuracy metric comprises a classifier indicating the subset of GPS locations; and determining the distance of the route based on the route-accuracy metric comprises determining a regional distance traveled by the client device within the region based on the subset of GPS locations. In some such embodiments, the acts 700 further include, based on the classifier indicating the subset of GPS locations, adjusting a digital map for the region to correspond to the subset of GPS locations.

As further shown in FIG. 7, the acts 700 include an act 740 of selecting, for each region, one of the subset of GPS locations or the subset of map-matched locations. For instance, in some embodiments, the act 740 includes selecting, for each region, one of the subset of GPS locations or the subset of map-matched locations based on the route-accuracy metric.

Finally, as shown in FIG. 7, the acts 700 include an act 750 of updating the route to include the selected subset of GPS locations or the selected subset of map-matched locations for each region. For example, in some embodiments, updating the route comprises determining a distance of the route based on the selected subset of GPS locations or the selected subset of map-matched locations for each region. As another example, in certain implementations, updating the route comprises adjusting a digital map for the region to correspond to the selected subset of GPS locations or the selected subset of map-matched locations for each region.

In addition to the acts 710-750, in certain embodiments, the acts 700 further include generating, for each region, a route tile for the region based on the subset of GPS locations for the region and the subset of map-matched locations for the region. In some such embodiments, utilizing the trained artificial neural network to determine the route-accuracy metric for each region comprises utilizing the trained artificial neural network to analyze the route tile for the region to generate the route-accuracy metric for the region.

Relatedly, in certain implementations, generating the route tile for each region comprises generating a first image matrix for the region comprising a representation of the subset of GPS locations for the region; and generating a second image matrix for the region comprising a representation of the subset of map-matched locations for the region. In some such implementations, generating the route tile for each region comprises determining a first estimated path of the client device within the region based on the subset of GPS locations for the region and a second estimated path of the client device with the region based on the subset of map-matched locations for the region; the first image matrix comprises a first set of pixels that represent the first estimated path of the client device within the region and a second set of pixels that represent positions outside of the first estimated path within the region; and the second image matrix comprises a third set of pixels that represent the second estimated path of the client device within the region and a fourth set of pixels that represent positions outside of the second estimated path within the region.

As noted above, the intelligent transportation routing system 104 trains an artificial network. In some such embodiments, generating the trained artificial neural network comprises generating a training route tile for a training region along a training route based on training GPS locations and corresponding training map-matched locations; utilizing an artificial neural network to predict a route-accuracy metric for the training region based on the training route tile; and generating the trained artificial neural network by comparing the route-accuracy metric to a ground-truth-route-accuracy metric for the training region.

Relatedly, in some implementations, generating the simulated training GPS locations comprises creating simulated route locations for the training route within a road network based on standard-traveling patterns of transportation vehicles; and generating the simulated training GPS locations by transforming the simulated route locations based on a GPS-noise model. Additionally, in one or more embodiments, generate the ground-truth-route-accuracy metric for the training region comprises determining an error value between the simulated training GPS locations and the simulated route locations; and comparing the determined error value to a noise threshold.

In some embodiments, the acts 700 include an alternative set of acts. For example, in some embodiments, the acts 700 include identifying GPS locations and map-matched locations for a route. For example, in some embodiments, the acts 700 include identifying GPS locations for a route traveled by a client device and map-matched locations for the route, wherein the client device is associated with a transportation vehicle.

Additionally, in certain embodiments, the acts 700 include generating regions along the route. For instance, in certain embodiments, the acts 700 include generating a plurality of regions along the route, wherein a region comprises a subset of GPS locations and a subset of map-matched locations.

Moreover, in some implementations, the acts 700 include generating a route tile for the region. For example, in some implementations, the act 700 includes generating a route tile for the region based on the subset of GPS locations and the subset of map-matched locations.

Further, in certain implementations, the acts 700 include utilizing an artificial neural network to determine a route-accuracy metric for the region. For instance, in some embodiments, the acts 700 includes utilizing an artificial neural network to determine a route-accuracy metric for the region based on the route tile. In certain embodiments, the route-accuracy metric for the region comprises an accuracy classifier for the route tile indicating a level of noise of the subset of GPS locations.

Finally, in some such embodiments, the acts 700 include determining a distance of the route based on the route-accuracy metric. As noted above, the route-accuracy metric may take a variety of forms. For example, in some embodiments, the route-accuracy metric comprises a classifier indicating the subset of GPS locations; and determining the distance of the route based on the route-accuracy metric comprises determining a regional distance traveled by the client device within the region based on the subset of GPS locations. In some such embodiments, the acts 700 further include, based on the classifier indicating the subset of GPS locations, adjusting a digital map for the region to correspond to the subset of GPS locations.

Alternatively, in some embodiments, the route-accuracy metric comprises a classifier indicating the subset of map-matched locations; and determining the distance of the route based on the route-accuracy metric comprises determining a regional distance traveled by the client device within the region based on the subset of map-matched locations.

Additionally, in certain embodiments, the route-accuracy metric for the region comprises a regional distance traveled by the client device within the region based on the route tile; and determining the distance of the route based on the route-accuracy metric comprises determining the distance of the route based on the regional distance traveled by the client device within the region.

As suggested above, in some embodiments, the acts 700 further include utilizing the artificial neural network to determine an additional route-accuracy metric for an additional region based on an additional a route tile; and determining the distance of the route based on the additional route-accuracy metric for the additional region and the route-accuracy metric for the region.

Figure 8:
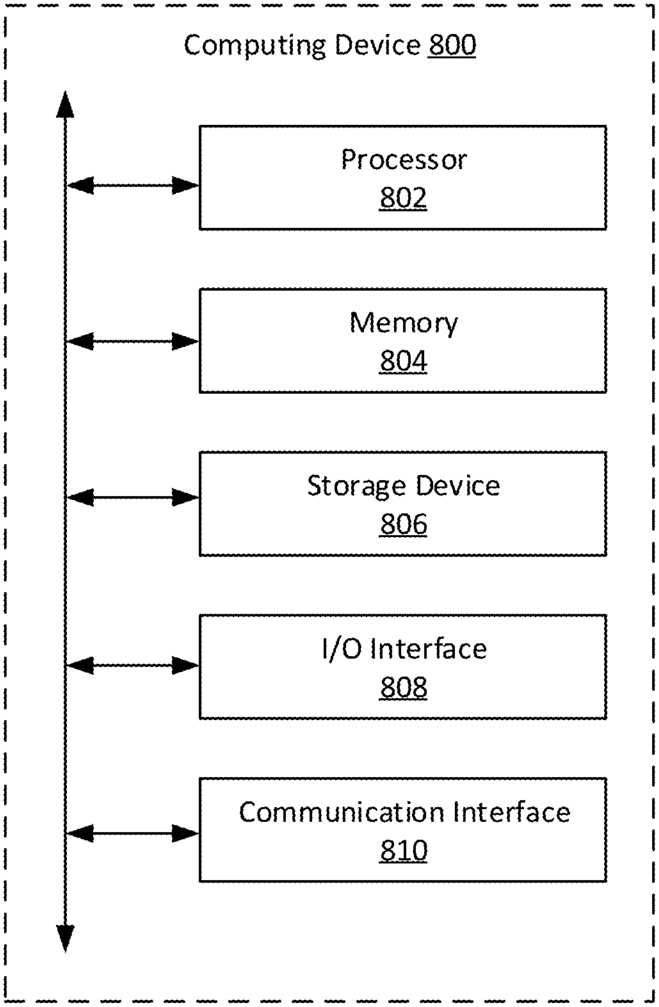
FIG. 8 illustrates a computer system according to an exemplary embodiment of the present disclosure.

FIG. 8 illustrates, in block diagram form, an exemplary computing device 800 that may be configured to perform one or more of the processes described above. One will appreciate that the intelligent transportation routing system 104 can comprise implementations of the computing device 800, including, but not limited to, the server(s) 102, the requestor client devices 110, the provider client device 116, the user device 302, the completed transportation route database 310, and the server 324. As shown by FIG. 8, the computing device can comprise a processor 802, memory 804, a storage device 806, an I/O interface 808, and a communication interface 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s) 802. The memory 804 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 804 may be internal or distributed memory.

The computing device 800 includes a storage device 806 for storing data or instructions. As an example, and not by way of limitation, storage device 806 can comprise a non-transitory storage medium described above. The storage device 806 may include a hard disk drive ("HDD"), flash memory, a Universal Serial Bus ("USB") drive or a combination of these or other storage devices.

The computing device 800 also includes one or more input or output ("I/O") interface 808, which are provided to allow a user (e.g., requestor or provider) to provide input to (such as user strokes), receive output from, and otherwise transfer data to and from the computing device 800. These I/O interface 808 may include a mouse, keypad or a keyboard, a touch screen, camera, optical scanner, network interface, modem, other known I/O devices or a combination of such I/O interface 808. The touch screen may be activated with a stylus or a finger.

The I/O interface 808 may include one or more devices for presenting output to a user, including, but not limited to, a graphics engine, a display (e.g., a display screen), one or more output providers (e.g., display providers), one or more audio speakers, and one or more audio providers. In certain embodiments, the I/O interface 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device and one or more other computing devices 800 or one or more networks. As an example, and not by way of limitation, communication interface 810 may include a network interface controller ("NIC") or network adapter for communicating with an Ethernet or other wire-based network or a wireless NIC ("WNIC") or wireless adapter for communicating with a wireless network, such as a WI-FI. The computing device 800 can further include a bus 812. The bus 812 can comprise hardware, software, or both that couples components of computing device 800 to each other.

Figure 9:
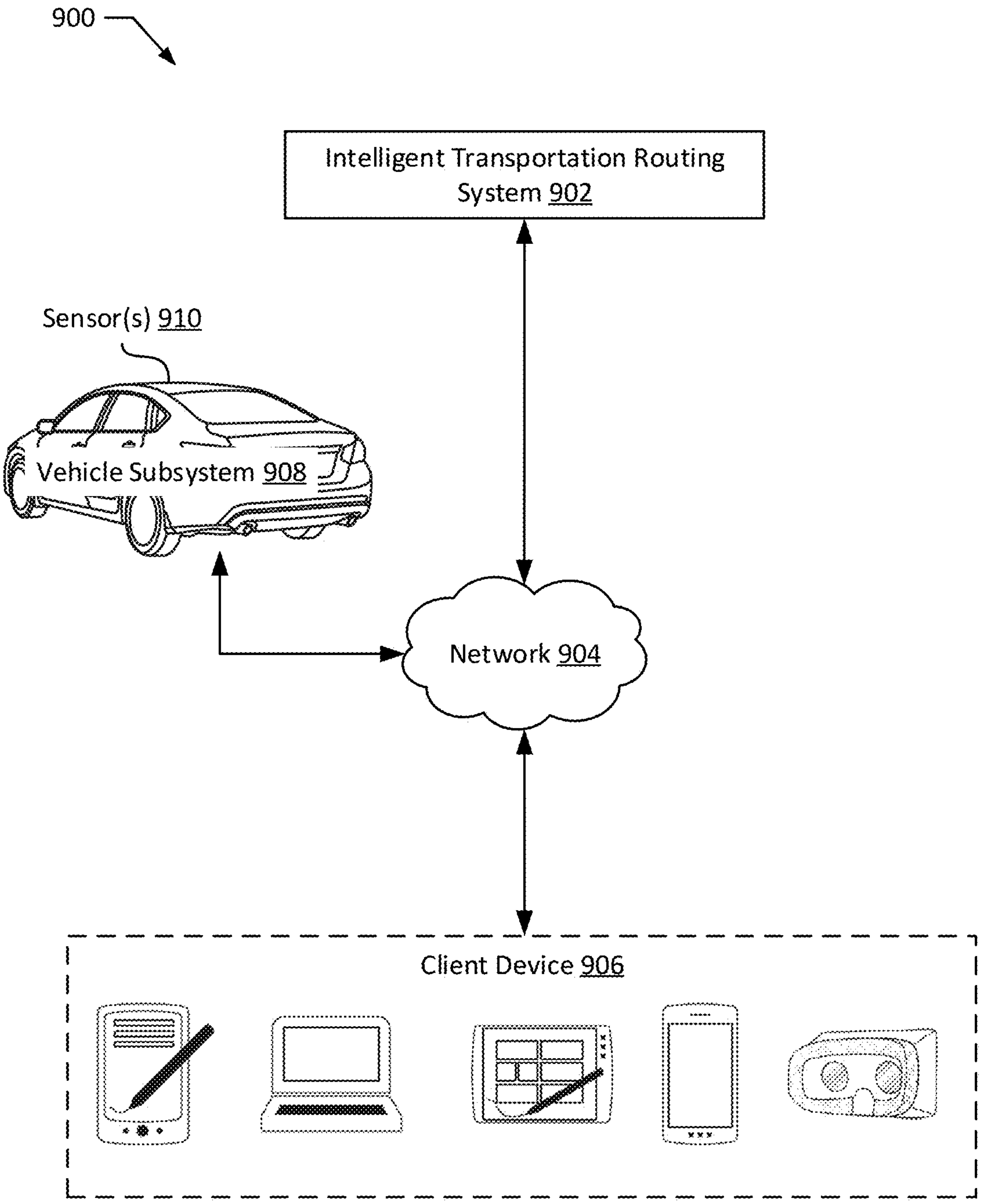
FIG. 9 illustrates a network environment according to an exemplary embodiment of the present disclosure.

FIG. 9 illustrates an example network environment 900 of an intelligent transportation routing system. The network environment 900 includes an intelligent transportation routing system 902, a client device 906, and a vehicle subsystem 908 connected to each other by a network 904. Although FIG. 9 illustrates a particular arrangement of the intelligent transportation routing system 902, client device 906, vehicle subsystem 908, and network 904, this disclosure contemplates any suitable arrangement of the intelligent transportation routing system 902, client device 906, vehicle subsystem 908, and network 904. As an example, and not by way of limitation, two or more of the client device 906, intelligent transportation routing system 902, and vehicle subsystem 908 communicate directly, bypassing network 904. As another example, two or more of the client device 906, intelligent transportation routing system 902, and vehicle subsystem 908 may be physically or logically co-located with each other in whole or in part. Moreover, although FIG. 9 illustrates a particular number of client devices 906, intelligent transportation routing systems 902, vehicle subsystems 908, and networks 904, this disclosure contemplates any suitable number of client devices 906, intelligent transportation routing systems 902, vehicle subsystems 908, and networks 904. As an example, and not by way of limitation, network environment 900 may include multiple client devices 906, intelligent transportation routing systems 902, vehicle subsystems 908, and networks 904.

This disclosure contemplates any suitable network 904. As an example, and not by way of limitation, one or more portions of network 904 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 904 may include one or more networks 904.

Links may connect client device 906, intelligent transportation routing system 902, and vehicle subsystem 908 to network 904 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, client device 906 may be an electronic device including hardware, software, or embedded logic components or a combination of two or more such components and capable of carrying out the appropriate functionalities implemented or supported by client device 906. As an example, and not by way of limitation, a client device 906 may include any of the computing devices discussed above in relation to FIG. 8. A client device 906 may enable a network user at client device 906 to access network 904. A client device 906 may enable its user to communicate with other users at other client devices 906.

In particular embodiments, client device 906 may include a requestor application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 906 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to client device 906 one or more Hyper Text Markup Language ("HTML") files responsive to the HTTP request. Client device 906 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, intelligent transportation routing system 902 may be a network-addressable computing system that can host a transportation matching network. Intelligent transportation routing system 902 may generate, store, receive, and send data, such as, for example, user-profile data, concept-profile data, text data, transportation request data, GPS location data, provider data, requestor data, vehicle data, or other suitable data related to the transportation matching network. This may include authenticating the identity of providers and/or vehicles who are authorized to provide transportation services through the intelligent transportation routing system 902. In addition, the dynamic transportation matching system may manage identities of service requestors such as users/requestors. In particular, the dynamic transportation matching system may maintain requestor data such as driving/riding histories, personal data, or other user data in addition to navigation and/or traffic management services or other location services (e.g., GPS services).

In particular embodiments, the intelligent transportation routing system 902 may manage transportation matching services to connect a user/requestor with a vehicle and/or provider. By managing the transportation matching services, the intelligent transportation routing system 902 can manage the distribution and allocation of resources from the vehicle subsystems 908 and user resources such as GPS location and availability indicators, as described herein.

Intelligent transportation routing system 902 may be accessed by the other components of network environment 900 either directly or via network 904. In particular embodiments, intelligent transportation routing system 902 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, intelligent transportation routing system 902 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 906, or an intelligent transportation routing system 902 to manage, retrieve, modify, add, or delete, the information stored in data store.

In particular embodiments, intelligent transportation routing system 902 may provide users with the ability to take actions on various types of items or objects, supported by intelligent transportation routing system 902. As an example, and not by way of limitation, the items and objects may include transportation matching networks to which users of intelligent transportation routing system 902 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in intelligent transportation routing system 902 or by an external system of a third-party system, which is separate from intelligent transportation routing system 902 and coupled to intelligent transportation routing system 902 via a network 904.

In particular embodiments, intelligent transportation routing system 902 may be capable of linking a variety of entities. As an example, and not by way of limitation, intelligent transportation routing system 902 may enable users to interact with each other or other entities, or to allow users to interact with these entities through an application programming interfaces ("API") or other communication channels.

In particular embodiments, intelligent transportation routing system 902 may include a variety of servers, subsystems, programs, modules, logs, and data stores. In particular embodiments, intelligent transportation routing system 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Intelligent transportation routing system 902 may also include suitable components such as network interfaces, security mechanisms, load balancers, failover servers, management-and-network-operations consoles, other suitable components, or any suitable combination thereof. In particular embodiments, intelligent transportation routing system 902 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between intelligent transportation routing system 902 and one or more client devices 906. An action logger may be used to receive communications from a web server about a user's actions on or off intelligent transportation routing system 902. In conjunction with the action log, a third-party-content-object log may be maintained of user exposures to third-party-content objects. A notification controller may provide information regarding content objects to a client device 906. Information may be pushed to a client device 906 as notifications, or information may be pulled from client device 906 responsive to a request received from client device 906. Authorization servers may be used to enforce one or more privacy settings of the users of intelligent transportation routing system 902. A privacy setting of a user determines how particular information associated with a user can be shared. The authorization server may allow users to opt in to or opt out of having their actions logged by intelligent transportation routing system 902 or shared with other systems, such as, for example, by setting appropriate privacy settings. Third-party-content-object stores may be used to store content objects received from third parties. Location stores may be used for storing location information received from client devices 906 associated with users.

In addition, the vehicle subsystem 908 can include a human-operated vehicle or an autonomous vehicle. A provider of a human-operated vehicle can perform maneuvers to pick up, transport, and drop off one or more requestors according to the embodiments described herein. In certain embodiments, the vehicle subsystem 908 can include an autonomous vehicle—i.e., a vehicle that does not require a human operator. When a transportation vehicle is an autonomous vehicle, the transportation vehicle may include additional components not depicted in FIG. 1A or FIG. 9, such as location components, one or more sensors by which the autonomous vehicle navigates, and/or other components necessary to navigate without a provider (or with minimal interactions with a provider). In these embodiments, the vehicle subsystem 908 can perform maneuvers, communicate, and otherwise function without the aid of a human provider, in accordance with available technology.

Additionally, in some embodiments, the vehicle subsystem 908 includes a hybrid self-driving vehicle with both self-driving functionality and some human operator interaction. This human operator interaction may work in concert with or independent of the self-driving functionality. In other embodiments, the vehicle subsystems 908 includes an autonomous provider that acts as part of the transportation vehicle, such as a computer-based navigation and driving system that acts as part of a transportation vehicle. Regardless of whether a transportation vehicle is associated with a provider, a transportation vehicle optionally includes a locator device, such as a GPS device, that determines the location of the transportation vehicle within the vehicle subsystem 908.

In particular embodiments, the vehicle subsystem 908 may include one or more sensors incorporated therein or associated thereto. For example, sensor(s) 910 can be mounted on the top of the vehicle subsystem 908 or else can be located within the interior of the vehicle subsystem 908. In certain embodiments, the sensor(s) 910 can be located in multiple areas at once—i.e., split up throughout the vehicle subsystem 908 so that different components of the sensor(s) 910 can be placed in different locations in accordance with optimal operation of the sensor(s) 910. In these embodiments, the sensor(s) 910 can include a LIDAR sensor and an inertial measurement unit ("IMU") including one or more accelerometers, one or more gyroscopes, and one or more magnetometers. The sensor(s) 910 can additionally or alternatively include a wireless IMU ("WIMU"), one or more cameras, one or more microphones, or other sensors or data input devices capable of receiving and/or recording information relating to navigating a route to pick up, transport, and/or drop off a requestor.

In particular embodiments, the vehicle subsystem 908 may include a communication device capable of communicating with the client device 906 and/or the intelligent transportation routing system 902. For example, the vehicle subsystem 908 can include an on-board computing device communicatively linked to the network 904 to transmit and receive data such as GPS location information, sensor-related information, requestor location information, or other relevant information.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

The invention claimed is:

1. A computer-implemented method comprising:

identifying, by at least one processor, an initial route prediction for a training transportation request, wherein the initial route prediction is generated utilizing a first route predictive model; and training a second route correction predictive model to correct errors of the first route predictive model, wherein the second route correction predictive model is different from the first route predictive model, by:

generating, utilizing the second route correction predictive model, a corrected route prediction for the training transportation request by refining the initial route prediction generated by the first route predictive model, the initial route prediction being provided as input to the second route correction predictive model;

receiving actual route information corresponding to fulfillment of the training transportation request;

determining one or more errors between the corrected route prediction and the actual route information; and updating the second route correction predictive model based on the one or more errors.

2. The computer-implemented method of claim 1, wherein the initial route prediction is generated utilizing the first route predictive model comprising a first machine learning model.

3. The computer-implemented method of claim 2, wherein training the second route correction predictive model comprises training a second machine learning model.

4. The computer-implemented method of claim 1, wherein training the second route correction predictive model comprises training at least one of a neural network or a decision tree model to correct errors of the first route predictive model.

5. The computer-implemented method of claim 1, wherein generating the initial route prediction comprises at least one of: generating a predicted route between a starting location and an ending location; generating a location prediction; generating a route distance prediction; or generating a travel time prediction.

6. The computer-implemented method of claim 1, wherein generating the corrected route prediction comprises at least one of: generating a corrected route between a starting location and an ending location; generating a corrected location prediction; generating a corrected route distance prediction; or generating a corrected travel time prediction.

7. The computer-implemented method of claim 1, wherein generating the corrected route prediction for the training transportation request from the initial route prediction generated by the first route predictive model comprises:
- determining contextual information corresponding to the training transportation request; and
- generating, utilizing the second route correction predictive model, the corrected route prediction for the training transportation request from the initial route prediction and the contextual information corresponding to the training transportation request.

8. A non-transitory computer readable storage medium comprising instructions that, when executed by at least one processor, cause the at least one processor to:
- identify an initial route prediction for a training transportation request, wherein the initial route prediction is generated utilizing a first route predictive model; and
- train a second route correction predictive model to correct errors of the first route predictive model, wherein the second route correction predictive model is different from the first route predictive model, by:
  - generating, utilizing the second route correction predictive model, a corrected route prediction for the training transportation request by refining the initial route prediction generated by the first route predictive model, the initial route prediction being provided as input to the second route correction predictive model;
  - receiving actual route information corresponding to fulfillment of the training transportation request;
  - determining one or more errors between the corrected route prediction and the actual route information; and
  - updating the second route correction predictive model based on the one or more errors.

9. The non-transitory computer readable storage medium of claim 8, wherein the initial route prediction is generated utilizing the first route predictive model comprising a first machine learning model.

10. The non-transitory computer readable storage medium of claim 9, further comprising instructions that, when executed by the at least one processor, cause the at least one processor to train the second route correction predictive model by training a second machine learning model.

11. The non-transitory computer readable storage medium of claim 8, further comprising instructions that, when executed by the at least one processor, cause the at least one processor to train the second route correction predictive model by training at least one of a neural network or a decision tree model to correct errors of the first route predictive model.

12. The non-transitory computer readable storage medium of claim 8, further comprising instructions that, when executed by the at least one processor, cause the at least one processor to generate the initial route prediction by generating at least one of: a predicted route between a starting location and an ending location; a location prediction; a route distance prediction; or generating a travel time prediction.

13. The non-transitory computer readable storage medium of claim 8, further comprising instructions that, when executed by the at least one processor, cause the at least one processor to generate the corrected route prediction by generating at least one of: a corrected route between a starting location and an ending location; a corrected location prediction; a corrected route distance prediction; or a corrected travel time prediction.

14. The non-transitory computer readable storage medium of claim 8, further comprising instructions that, when executed by the at least one processor, cause the at least one processor to generate the corrected route prediction for the training transportation request from the initial route prediction generated by the first route predictive model by:
- determining contextual information corresponding to the training transportation request; and
- generating, utilizing the second route correction predictive model, the corrected route prediction for the training transportation request from the initial route prediction and the contextual information corresponding to the training transportation request.

15. A system comprising:
- at least one processor; and
- a non-transitory computer-readable medium comprising instructions that, when executed by the at least one processor, to cause the system to:
  - identify an initial route prediction for a training transportation request, wherein the initial route prediction is generated utilizing a first route predictive model; and
  - train a second route correction predictive model to correct errors of the first route predictive model, wherein the second route correction predictive model is different from the first route predictive model, by:
    - generating, utilizing the second route correction predictive model, a corrected route prediction for the training transportation request by refining the initial route prediction generated by the first route predictive model, the initial route prediction being provided as input to the second route correction predictive model;
    - receiving actual route information corresponding to fulfillment of the training transportation request;
    - determining one or more errors between the corrected route prediction and the actual route information; and
    - updating the second route correction predictive model based on the one or more errors.

16. The system of claim 15, wherein the initial route prediction is generated utilizing the first route predictive model comprising a first machine learning model.

17. The system of claim 16, further comprising instructions that, when executed by the at least one processor, cause the system to train the second route correction predictive model by training a second machine learning model.

18. The system of claim 15, further comprising instructions that, when executed by the at least one processor, cause the system to train the second route correction predictive model by training at least one of a neural network or a decision tree model to correct errors of the first route predictive model.

19. The system of claim 15, further comprising instructions that, when executed by the at least one processor, cause the system to:

generate the initial route prediction by generating at least one of: a predicted route between a starting location and an ending location; a location prediction; a route distance prediction; or generating a travel time prediction; and generate the corrected route prediction by generating at least one of: a corrected route relative to the predicted route; a corrected location prediction; a corrected route distance prediction; or a corrected travel time prediction.

20. The system of claim 15, further comprising instructions that, when executed by the at least one processor, cause the system to generate the corrected route prediction for the training transportation request from the initial route prediction generated by the first route predictive model by:

determining contextual information corresponding to the training transportation request; and generating, utilizing the second route correction predictive model, the corrected route prediction for the training transportation request from the initial route prediction and the contextual information corresponding to the training transportation request.

* * * * *